(12) United States Patent
Tsfati et al.

(10) Patent No.: US 8,537,798 B2
(45) Date of Patent: Sep. 17, 2013

(54) COEXISTENCE MECHANISM FOR COLLOCATED WLAN AND WWAN COMMUNICATION DEVICES

(75) Inventors: Yossef Tsfati, Rishon Le-Zion (IL); Olaf J. Hirsch, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 30 days.

(21) Appl. No.: 12/983,217

(22) Filed: Dec. 31, 2010

(65) Prior Publication Data

US 2012/0170556 A1 Jul. 5, 2012

(51) Int. Cl.
*H04W 4/00* (2009.01)
(52) U.S. Cl.
USPC ......................................................... 370/338
(58) Field of Classification Search
USPC ......... 370/203, 204–215, 229–240, 310–337, 370/338–350, 351–394, 395.1, 395.3, 395.4, 370/395.41, 395.42, 395.5, 395.52, 395.53, 370/412–421, 431–457, 458–463, 464–497, 370/498–522, 521–529
See application file for complete search history.

(56) References Cited

U.S. PATENT DOCUMENTS

| | | | |
|---|---|---|---|
| 7,542,728 B2 * | 6/2009 | Bitran et al. ...................... 455/73 |
| 7,545,787 B2 * | 6/2009 | Bitran et al. ................... 370/338 |
| 7,567,820 B2 * | 7/2009 | Bitran et al. ............... 455/552.1 |
| 7,613,171 B2 * | 11/2009 | Zehavi et al. .................. 370/352 |
| 7,688,784 B2 * | 3/2010 | Bitran et al. ................... 370/329 |
| 7,822,436 B2 * | 10/2010 | Bitran et al. ................ 455/550.1 |
| 7,876,741 B2 * | 1/2011 | Joung et al. .................... 370/350 |
| 7,904,112 B2 * | 3/2011 | Bitran et al. ............... 455/552.1 |
| 7,986,665 B2 * | 7/2011 | Kezys et al. ................... 370/331 |
| 8,019,296 B1 * | 9/2011 | Durig .......................... 455/127.4 |
| 8,072,913 B2 * | 12/2011 | Desai ............................. 370/311 |
| 8,094,631 B2 * | 1/2012 | Banerjea et al. .............. 370/338 |
| 8,160,001 B2 * | 4/2012 | Bitran ........................... 370/328 |

(Continued)

FOREIGN PATENT DOCUMENTS

| | | | |
|---|---|---|---|
| WO | WO2004045092 A1 | 5/2004 |
| WO | WO2007031960 A2 | 3/2007 |
| WO | WO2012092570 | 7/2012 |
| WO | WO2012092574 | 7/2012 |

OTHER PUBLICATIONS

International Search Report and Written Opinion—PCT/US2011/068129—ISA/EPO—Mar. 16, 2012, 14 pages.
International Search Report and Written Opinion—PCT/US2011/068145—ISA/EPO—Mar. 16, 2012, 15 pages.

(Continued)

*Primary Examiner* — Jung-Jen Liu
(74) *Attorney, Agent, or Firm* — DeLizio Gilliam, PLLC

(57) ABSTRACT

Wireless radio devices that communicate in close proximity to each other typically suffer from interference. Such interference between collocated wireless radio devices can lead to degradation in performance of one or both of the wireless radio devices. Functionality can be implemented to coordinate communications of collocated WLAN and WWAN devices to minimize interference between the WLAN device and the WWAN device. The WLAN device can determine a WLAN communication time interval associated with the WLAN device for performing WLAN communication operations and a WWAN communication time interval associated with the WWAN device for performing WWAN communication operations. In response to determining that the WLAN communication time interval is in progress, WLAN communication operations can be performed at the WLAN device. In response to determining that the WLAN communication time interval is not in progress, the WLAN device can delay performing the WLAN communication operations.

39 Claims, 12 Drawing Sheets

(56) References Cited

U.S. PATENT DOCUMENTS

| | | | |
|---|---|---|---|
| 8,185,092 B1* | 5/2012 | Durig | 455/411 |
| 8,204,036 B2* | 6/2012 | Russell et al. | 370/350 |
| 8,243,689 B2* | 8/2012 | Youn et al. | 370/332 |
| 8,265,038 B2* | 9/2012 | Kezys et al. | 370/331 |
| 2005/0086569 A1* | 4/2005 | Hiddink et al. | 714/749 |
| 2007/0184798 A1* | 8/2007 | Bitran et al. | 455/132 |
| 2007/0268884 A1 | 11/2007 | Kolavennu et al. | |
| 2008/0227488 A1 | 9/2008 | Zhu et al. | |
| 2009/0040937 A1* | 2/2009 | Xhafa et al. | 370/252 |
| 2009/0129367 A1 | 5/2009 | Bitran | |
| 2010/0165959 A1 | 7/2010 | Park et al. | |
| 2012/0170556 A1* | 7/2012 | Tsfati et al. | 370/338 |
| 2012/0170557 A1 | 7/2012 | Tsfati et al. | |

OTHER PUBLICATIONS

Co-pending U.S. Appl. No. 12/983,219, filed Dec. 31, 2010, 59 pages.

"U.S. Appl. No. 12/983,219 Office Action", Oct. 23, 2012, 84 pages.

Written Opinion of the International Preliminary Examining Authority—PCT/US2011/068145—ISA/EPO—Jan. 7, 2013, 9 pages.

International Preliminary Report on Patentability—PCT/US2011/068129—ISA/EPO—Jan. 4, 2013, 8 pages.

"PCT Application No. PCT/US11/68129 International Preliminary Report on Patentability", Jan. 4, 2013, 8 pages.

"PCT/US2011/068145 Written Opinion of the International Preliminary Examining Authority (PCT Rule 66)", Jan. 7, 2013, 9 pages.

* cited by examiner

COEXISTENCE MECHANISM FOR COLLOCATED WLAN AND WWAN COMMUNICATION DEVICES

BACKGROUND

Embodiments of the inventive subject matter generally relate to the field of wireless communications and, more particularly, to a coexistence mechanism for collocated WLAN and WWAN communication devices.

When wireless devices are in close proximity to each other, communications from one wireless device may interfere with communications from the other wireless device. For example, when wireless wide area network (WWAN) devices (e.g., Long-Term Evolution (LTE) devices) and wireless local area network (WLAN) devices operate in close proximity to each other, some frequency bands used by WWAN devices may be too close to frequency bands used by WLAN devices, resulting in interference between the WLAN and the WWAN devices. For example, in a system having an LTE device located in close proximity to a WLAN device, some frequency bands used by the LTE device (e.g., LTE band 38 and LTE band 40) may be very close to WLAN frequency bands (e.g., the WLAN 2.4 GHz ISM band). Furthermore, the radio protocol of one wireless device can interfere with the radio protocol of the other wireless device.

SUMMARY

Various embodiments of a coexistence mechanism for collocated WLAN and WWAN communication devices are disclosed. In one embodiment, a WLAN device of a communication system determines a WLAN communication time interval associated with the WLAN device for performing WLAN communication operations and a WWAN communication time interval associated with a WWAN device of the communication system for performing WWAN communication operations. The WLAN device is coupled with the WWAN device. A coexistence signal is provided from the WLAN device to the WWAN device to indicate the WLAN communication time interval associated with the WLAN device and the WWAN communication time interval associated with the WWAN device. It is determined, at the WLAN device, whether the WLAN communication time interval is in progress to determine whether to perform one or more WLAN communication operations. In response to determining that the WLAN communication time interval is in progress, the one or more WLAN communication operations are performed at the WLAN device. In response to determining that the WLAN communication time interval is not in progress, it is determined not to perform the one or more WLAN communication operations.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
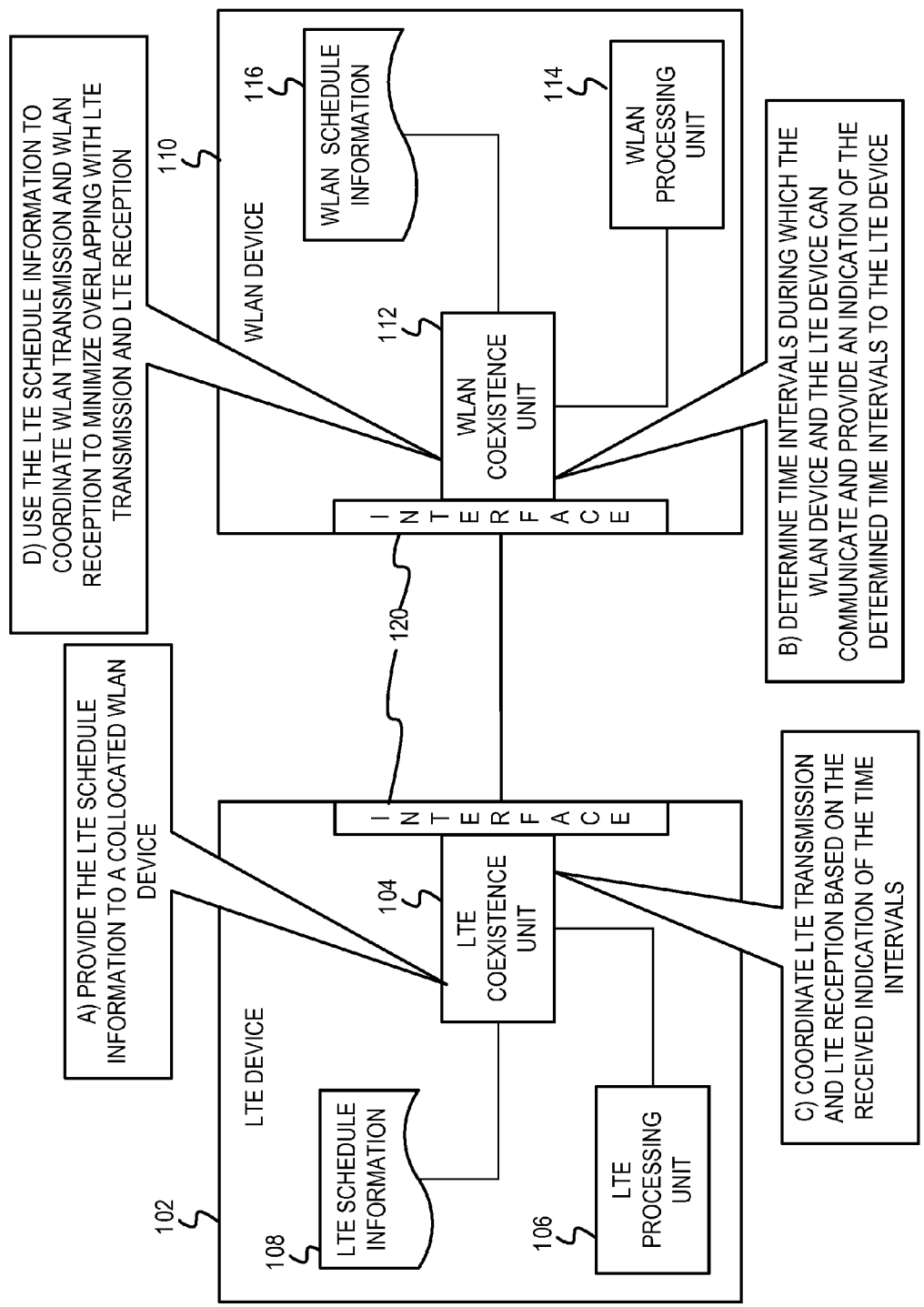
FIG. 1 is an example conceptual diagram illustrating a coexistence mechanism for collocated WLAN and LTE devices, according to some embodiments.

The description that follows includes exemplary systems, methods, techniques, instruction sequences, and computer program products that embody techniques of the present inventive subject matter. However, it is understood that the described embodiments may be practiced without these specific details. For instance, although examples refer to a coexistence mechanism for a collocated WLAN device and a LTE device, embodiments are not so limited. In other embodiments, the coexistence mechanism described herein can be implemented for other WWAN standards and devices, e.g., WiMAX, Global System for Mobile Communications (GSM), 3G, 4G, etc. In other instances, well-known instruction instances, protocols, structures, and techniques have not been shown in detail in order not to obfuscate the description.

Interference between wireless radio devices (e.g., an LTE device and a WLAN device) may occur when the wireless radio devices are collocated on a common system and/or are communicating in close proximity to each other. Such interference between the collocated wireless radio devices can result in performance degradation. Existing techniques typically employ a large number of expensive RF filters with a sharp frequency roll-off (e.g., bulk acoustic wave (BAW) devices, thin film bulk acoustic resonators (FBARs), etc.) near the antennas of the wireless radio devices to filter blockers in adjacent frequency bands and unwanted out-of-band signals. However, the RF filters may not be able to completely eliminate the blockers and out-of-band signals because of practical filter limitations. For example, LTE band 40 (associated with a frequency band of 2.3 GHz-2.4 GHz) coincides with the WLAN 2.4 GHz frequency band. In this example, adding RF filters (e.g., with a sharp frequency roll-off) may filter out a substantial portion of the 2.4 GHz ISM band and, therefore, may render portions of the 2.4 GHz WLAN frequency band ineffective. Furthermore, these types of RF filters may be ineffective in rejecting LTE transmissions that can impact WLAN communications (or WLAN transmissions that can impact LTE communications). Using a large number of RF filters can also increase the cost associated with the wireless radio devices. Furthermore, in some cases (e.g., when the wireless radio devices operate in a large temperature range, such as −30° C. to +85° C.), the out-of-band signal rejection abilities of the RF filters may be degraded and hence additional processing components (e.g., filters, power amplifiers, low-noise amplifiers, etc.) may be utilized in the wireless radio devices, which further increases the implementation cost and complexity.

In some embodiments, a coexistence mechanism can be implemented that enables quasi-simultaneous operation of the collocated wireless radio devices. The collocated wireless radio devices can be configured to schedule communications during certain allocated communication time intervals to minimize packet collision and interference. For example, the coexistence mechanism can be implemented to enable the collocated WLAN device (operating in the 2.4 GHz frequency band) and the LTE device (operating at frequency bands that are very close to the 2.4 GHz frequency band) to operate with minimal interference. The wireless radio devices can exchange coexistence signals via a coexistence interface to indicate their respective transmission and reception activity, to schedule time intervals during which each of the wireless radio devices are permitted to communicate, and to schedule their transmission and reception time intervals to minimize interference between the wireless radio devices. The wireless radio devices can also throttle their transmissions (and/or switch to a low power state) to enable both the wireless radio devices to share the communication medium while minimizing interference between the wireless radio devices. Such a coexistence mechanism can preclude the need for expensive RF filters (and additional processing components) for minimizing interference between the wireless radio devices and can enable simultaneous operation of the wireless radio devices (when the wireless radio devices operate in adjacent frequency bands).

FIG. 1 is an example conceptual diagram illustrating a coexistence mechanism for collocated WLAN and LTE devices, according to some embodiments. As illustrated in FIG. 1, in some implementations, the LTE device 102 (e.g., which may be referred to as "LTE user equipment (UE)") and the WLAN device 110 can be embodied on distinct integrated circuits (e.g., distinct LTE and WLAN chips) on a common circuit board (or on separate circuit boards in close proximity). In other implementations, the LTE device 102 and the WLAN device 110 can be embodied on a single integrated circuit (e.g., a system on a chip (SoC)). The LTE device 102 and the WLAN device 110 can be included within various types of electronic devices with wireless communication capabilities (e.g., mobile phones, notebook computer, tablet computers, gaming consoles, personal computers, etc). For example, the LTE device 102 and the WLAN device 110 may be collocated within a portable router. The LTE device 102 may be a wide area network (WAN) modem and the WLAN device 110 may be a local area network (LAN) bridge to another electronic device (e.g., a personal computer). The LTE device 102 and the WLAN device 110 may operate simultaneously to facilitate data transfer between the portable router and the personal computer.

In some implementations, the LTE device 102 comprises an LTE coexistence unit 104, an LTE processing unit 106, and LTE schedule information 108. The LTE coexistence unit 104 is configured to communicate with the LTE processing unit 106. The LTE coexistence unit 104 may also generate the LTE schedule information 108. In some implementations, the WLAN device 110 comprises a WLAN coexistence unit 112, a WLAN processing unit 114, and WLAN schedule information 116. The WLAN coexistence unit 112 can communicate with the WLAN processing unit 114. The WLAN coexistence unit 112 may also generate the WLAN schedule information 116. In one implementation, the WLAN processing unit 114 can be a medium access control (MAC) unit. The LTE device 102 and the WLAN device 110 communicate via an interface 120. In one implementation, the interface 120 can be a physical interface comprising wires connecting the LTE device 102 and the WLAN device 110. In another implementation, the interface 120 can be a bi-directional digital interface over which digital control coexistence signals can be exchanged. In another implementation, the interface 120 can be a bi-directional message-based coexistence interface over which messages comprising coexistence information are exchanged between the LTE device 102 and the WLAN device 110. The WLAN coexistence unit 114 and the LTE coexistence unit 104 can use the interface 120 to exchange information regarding pending communications, operating frequency information, type of LTE technology being used (e.g., time division duplex (TDD) or frequency division duplex (FDD)), and other related information, as will be further described below. In some implementations, the information regarding pending communications can comprise an exact transmission and reception schedule, a future transmission and reception schedule, the periodicity of the transmission and the reception, a priority of the communications, etc. As will be described below with reference to stages A-D, the WLAN coexistence unit 112 and the LTE coexistence unit 104 can schedule communications of their respective devices to minimize interference with the collocated device.

At stage A, the LTE coexistence unit 104 transmits the LTE schedule information 108 to the WLAN coexistence unit 112. The LTE schedule information 108 can indicate timing information of coexistence events such as a start time of LTE packet transmission, a start time of LTE packet reception, a transmission/reception duration, packet priority, etc. In some implementations, if the exact timing information (e.g., the start time of LTE packet transmission/reception) is not predictable, the LTE coexistence unit 104 can indicate a LTE communication slot duration and an interval within each communication slot during which the LTE device 102 is programmed to transmit ("LTE transmit interval") and receive ("LTE receive interval"). For example, in accordance with TDD-LTE communication protocols, the LTE communication slot may be 5 ms, and each 5 ms communication slot may be partitioned into a 2 ms LTE transmit interval and a 3 ms LTE receive interval.

At stage B, the WLAN coexistence unit 112 determines a time interval during which only the WLAN device 110 can communicate ("WLAN allocated communication time interval") and a time interval during which only the LTE device 102 can communicate ("LTE allocated communication time interval"). In one implementation, the WLAN coexistence unit 112 can determine the WLAN allocated communication time interval and the LTE allocated communication time interval based on knowledge of a WLAN beacon interval and an LTE frame interval. In other implementations, if the LTE schedule information 108 and/or the WLAN schedule information 116 are available, the WLAN coexistence unit 112 may take the LTE schedule information 108 and/or the WLAN schedule information 116 into consideration when determining the WLAN allocated communication time interval and the LTE allocated communication time interval. The WLAN device 110 may not communicate during the LTE allocated communication time interval and, likewise, the LTE device 102 may not communicate any LTE user data during the WLAN allocated communication time interval. This can ensure that LTE packet transmissions do not interfere with WLAN packet receptions and that WLAN packet transmissions do not interfere with LTE packet receptions. The WLAN coexistence unit 112 can also notify the LTE coexistence unit 104 of the WLAN allocated communication time interval and the LTE allocated communication time interval.

At stage C, the LTE coexistence unit 104 coordinates LTE transmission and LTE reception based, at least in part, on the WLAN allocated communication time interval and the LTE allocated communication time interval. As will be described with reference to FIG. 3, the LTE coexistence unit 104 can cause the LTE processing unit 106 to transmit LTE packets (e.g., the LTE user data) and to receive LTE packets only during the LTE allocated communication time interval. In some implementations, as will be described below, the LTE processing unit 106 may transmit the LTE packets only during the LTE allocated communication time interval but may receive LTE packets (e.g., control packets, data packets, etc.) from the LTE base station during either the LTE or the WLAN communication intervals. Furthermore, the LTE processing unit 106 may immediately transmit a response to the received LTE packets (e.g., an acknowledgement message) irrespective of whether this transmission (of the acknowledgement message) occurs during the LTE communication interval or the WLAN communication interval. The LTE processing unit 106 can transmit the response to the received LTE packets at low power to minimize interference with communications of the WLAN device 110. In some implementations, the LTE device 102 may switch to a low power state during the WLAN allocated communication time interval. In other implementations, as will be described with reference to FIGS. 6-8, the LTE device 102 may receive (but not transmit) LTE packets during the WLAN allocated communication time interval.

At stage D, the WLAN coexistence unit 112 coordinates WLAN transmission and WLAN reception to minimize overlapping with LTE transmission and LTE reception based, at least in part, on the WLAN allocated communication time interval and the LTE allocated communication time interval. As will be described with reference to FIG. 2, the WLAN coexistence unit 112 can cause the WLAN processing unit 114 to transmit WLAN packets and receive WLAN packets only during the WLAN allocated communication time interval. In some implementations, when the WLAN device 110 is configured as an access point, the WLAN device 110 may switch to the low power state during the LTE allocated communication time interval. In other implementations, when the WLAN device 110 is configured as a WLAN client station as will be described with reference to FIGS. 4-5, the WLAN processing unit 114 may schedule its communications so that WLAN transmissions coincide with the LTE transmit interval and WLAN receptions coincide with the LTE receive interval. In other implementations, as will be described with reference to FIGS. 6-8, the WLAN processing unit 114 may receive (but not transmit) WLAN packets during the LTE allocated communication time interval.

Figure 2:
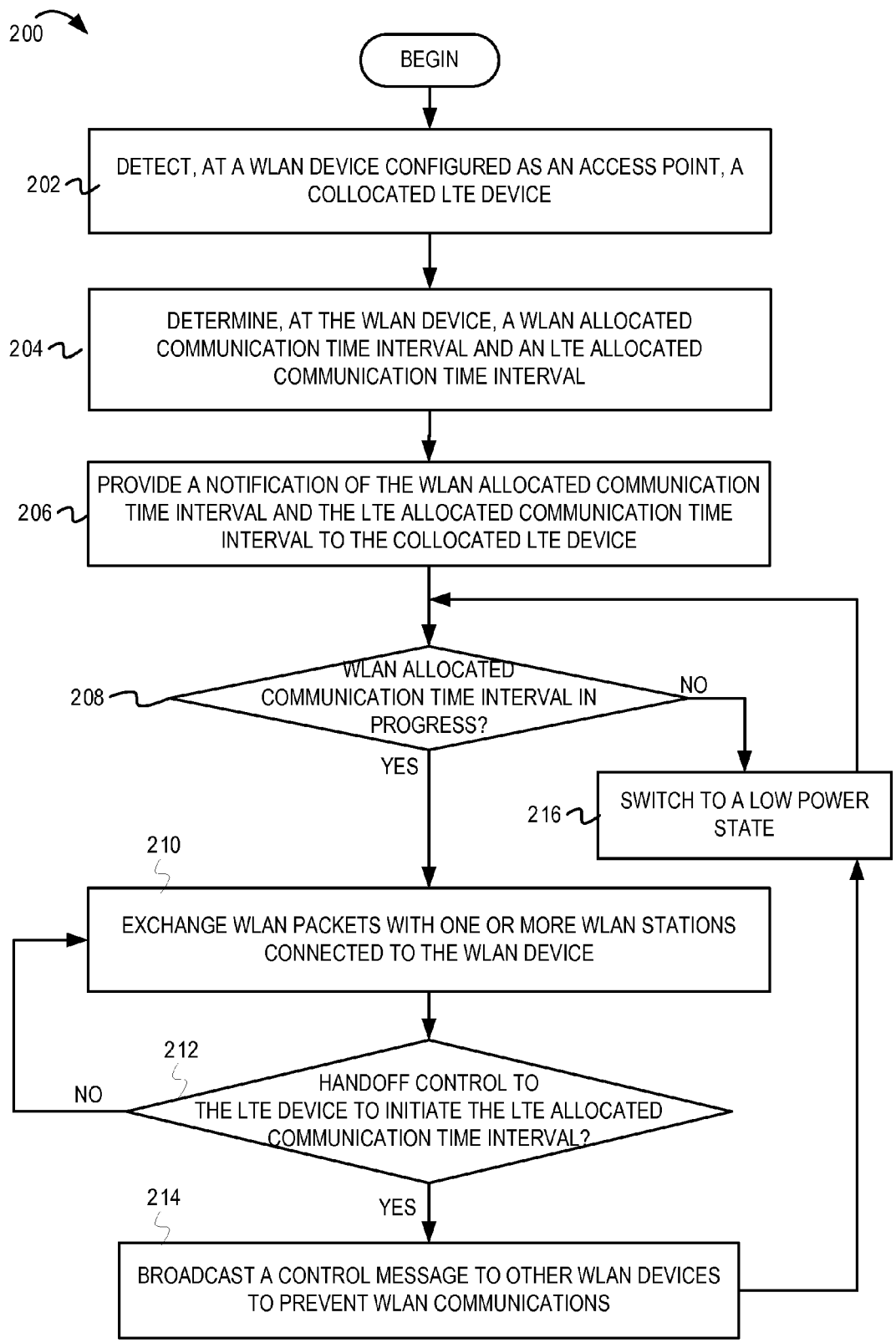
FIG. 2 is a flow diagram illustrating example operations of a WLAN device configured to implement a time-splitting scheduling coexistence mechanism for control of the communication medium.

FIG. 2 is a flow diagram ("flow") 200 illustrating example operations of a WLAN device configured to implement a time-splitting scheduling coexistence mechanism for control of the communication medium. The flow 200 begins at block 202.

At block 202, a WLAN device configured as an access point detects a collocated LTE device. In one implementation, the WLAN device may be a portable router or mobile phone configured as an access point. With reference to FIG. 1, the LTE device 102 may be collocated with the WLAN device 110 and the WLAN coexistence unit 112 may detect the collocated LTE device 102. In one implementation, the LTE coexistence unit 104 may transmit a coexistence signal to notify the WLAN coexistence unit 112 of the presence of the collocated LTE device 102. In another implementation, the WLAN coexistence unit 112 may access a predetermined memory location to determine whether there are other communication devices collocated with the WLAN device 110. In some implementations, the WLAN coexistence unit 112 may also receive the LTE schedule information 108 from the LTE coexistence unit 104. For example, the WLAN coexistence unit 112 may receive an indication of when (i.e., a time instant) the collocated LTE device 102 is scheduled to transmit/receive LTE packets, a priority of the LTE packets scheduled to be transmitted/received, and/or other scheduling related information. The flow continues at block 204.

At block 204, a WLAN allocated communication time interval and an LTE allocated communication time interval are determined at the WLAN device. For example, the WLAN coexistence unit 112 can determine the WLAN allocated communication time interval and the LTE allocated communication time interval. In some implementations, the WLAN coexistence unit 112 can determine the WLAN allocated communication time interval and the LTE allocated communication time interval based, at least in part, on the LTE schedule information 108. When determining the LTE allocated communication time interval and the WLAN allocated communication time interval, the WLAN coexistence unit 112 may also take into consideration a WLAN beacon interval, the frame structure (or frame interval) of an LTE base station (e.g., which may be referred to as "evolved NodeB" or "eNodeB" for LTE) to which the LTE device 102 is connected, a maximum duration for which the LTE device 102 can delay transmitting a response (e.g., acknowledgement messages, etc.) to the LTE base station before the LTE packet will be retransmitted, and/or other related information. The LTE coexistence unit 104 can provide the LTE schedule information 108, the LTE frame interval, the LTE transmission/reception period, and/or other LTE related information to the WLAN coexistence unit 112 in one or more coexistence messages sent via the interface 120. In another implementation, the WLAN allocated communication time interval and the LTE allocated communication time interval can be predefined to a default value. In another implementation, the WLAN allocated communication time interval and the LTE allocated communication time interval may be dynamically configurable. In some implementations, the WLAN coexistence unit 112 may allot an equal amount of time for the WLAN allocated communication time interval and the LTE allocated communication time interval. For example, WLAN coexistence unit 112 may determine that the WLAN allocated communication time interval and the LTE allocated communication time interval should each be 20 ms. In other implementations, the WLAN coexistence unit 112 may allot different amounts of time for the WLAN allocated communication time interval and the LTE allocated communication time interval (e.g., depending on the LTE schedule information 108, the WLAN beacon interval, the LTE frame interval, etc.). For example, WLAN coexistence unit 112 may determine that the WLAN allocated communication time interval should be 20 ms and that the LTE allocated communication time interval should be 30 ms. As will be described below, the WLAN device 110 can coordinate its communications (e.g., WLAN packet transmissions and WLAN packet receptions) to be within the WLAN allocated communication time interval. For example, the WLAN and LTE allocated communication time intervals may be allotted such that a first 20 ms is allocated to the WLAN device 110, the next 20 ms is allocated to the LTE device 102, the next 20 ms is allocated to the WLAN device 110, and so on. In other words, the WLAN allocated communication time interval and LTE allocated communication time interval can be consecutive and periodically repeating time intervals. The WLAN processing unit 114 can then ensure that the WLAN device 110 communicates during the allocated 20 ms and enters the low power state during the 20 ms time interval allocated to the LTE device 102. The flow continues at block 206.

At block 206, a notification of the WLAN allocated communication time interval and the LTE allocated communication time interval is provided to the collocated LTE device. In one implementation, the WLAN coexistence unit 112 can provide a coexistence message via the interface 120 indicating the WLAN allocated communication time interval and the LTE allocated communication time interval to the LTE coexistence unit 104. For example, the WLAN coexistence unit 112 may indicate that the WLAN allocated communication time interval and the LTE allocated communication time interval are 20 ms long. The WLAN coexistence unit 112 may also indicate a time instant at which the LTE allocated communication time interval is scheduled to start or a time interval after which the LTE allocated communication time interval will start. For example, the WLAN coexistence unit 112 may indicate that the LTE allocated communication time interval of 20 ms will start after 10 ms. As will be described with reference to FIG. 3, the LTE device 102 can coordinate its communications (e.g., LTE packet transmissions) to be within the LTE allocated communication time interval. The flow continues at block 208.

At block 208, it is determined whether the WLAN allocated communication time interval is currently in progress. For example, the WLAN coexistence unit 112 can determine whether the WLAN allocated communication time interval is currently in progress. In one implementation, the WLAN coexistence unit 112 can implement a WLAN coexistence timer to determine whether the WLAN allocated communication time interval is currently in progress. The WLAN coexistence unit 112 and/or other processing components of the WLAN device 110 can detect a trigger (based on the WLAN coexistence timer) when the WLAN allocated communication time interval begins or elapses. As described above, the WLAN processing unit 114 may be permitted to transmit or receive WLAN packets only during the WLAN allocated communication time interval. In some implementations, the WLAN coexistence unit 112 can determine whether the WLAN allocated communication time interval is currently in progress and can notify the WLAN processing unit 114 when the WLAN allocated communication time interval begins and ends. In another implementation, the WLAN processing unit 114 can itself keep track of when the WLAN allocated communication time interval begins and ends. If it is determined that the WLAN allocated communication time interval is currently in progress, the flow continues at block 210. Otherwise, the flow continues at block 216.

At block 210, WLAN packets are exchanged with one or more WLAN stations connected to the WLAN device. The flow 200 moves from block 208 to block 210 if the WLAN coexistence unit 112 determines that the WLAN allocated communication time interval is currently in progress. During the WLAN allocated communication time interval, the WLAN processing unit 114 can receive WLAN packets from one or more WLAN stations connected to the WLAN device 110 (e.g., when the WLAN device 110 is configured as a WLAN access point). The WLAN processing unit 114 can poll the connected WLAN stations to cause the connected WLAN stations to transmit their respective WLAN packets (if any). The WLAN processing unit 114 can also transmit WLAN packets intended for the connected WLAN stations and can also transmit control messages (e.g., beacon messages, probe response messages, etc.). In one implementation, the WLAN processing unit 114 can determine (e.g., based on the WLAN schedule information 116, based on data in a data transmit queue, etc.) a number of WLAN packets that can be transmitted before the WLAN allocated communication time interval elapses or before the WLAN device 102 is scheduled to receive a WLAN packet. The flow continues at block 212.

At block 212, it is determined whether to handoff control to the LTE device to initiate the LTE allocated communication time interval. For example, the WLAN coexistence unit 112 can determine whether to handoff control to the LTE device 102 to initiate the LTE allocated communication time interval. In one implementation, the WLAN coexistence unit 112 can access the WLAN coexistence timer to determine whether to handoff control to the LTE device 102 to initiate the LTE allocated communication time interval. In another implementation, the WLAN coexistence timer may notify the WLAN coexistence unit 112 just before the WLAN allocated communication time interval elapses. For example, based on knowledge that the WLAN device 110 requires 1 ms to transmit control messages (e.g., to one or more WLAN devices such as WLAN access points, connected WLAN stations, etc.) for switching to the low power state, the WLAN coexistence timer may indicate (e.g., to the WLAN coexistence unit 112) to handoff control and suspend WLAN communications 1 ms before the WLAN allocated communication time interval elapses. If it is determined to handoff control to the LTE device 102 to initiate the LTE allocated communication time interval, the flow continues at block 214. Otherwise, the WLAN device 110 retains control of the communication medium and the flow loops back to block 210 where the WLAN device 110 can continue to communicate with the WLAN stations connected to the WLAN device 110.

At block 214, a control message is broadcast to other WLAN devices to prevent WLAN communications associated with the WLAN device. For example, the WLAN processing unit 114 can broadcast a CTS2SELF control message to other WLAN devices to prevent WLAN communications. As part of the CTS2SELF message, the WLAN processing unit 114 can also indicate a time interval (e.g., the LTE allocated communication time interval) for which the other WLAN devices should not initiate WLAN communications. For example, the WLAN processing unit 114 can set a network allocation vector (NAV) parameter in the CTS2SELF message to indicate the time interval for which the WLAN communications should not be initiated. The WLAN devices that receive the CTS2SELF message from the WLAN device 110 do not initiate WLAN communications. This can free the communication medium from WLAN communications, thus preventing interference between LTE communications and WLAN communications during the LTE allocated communication time interval. It is noted that in some implementations, on determining to handoff control to the LTE device 102, the WLAN processing unit 114 can transmit (via the interface 120) a coexistence message to the LTE device 102 to indicate the start of the LTE allocated communication time interval. The flow continues at block 216.

At block 216, the WLAN device switches to a low power state. For example, the WLAN coexistence unit 112 can cause the WLAN processing unit 114 and the other processing components of the WLAN device 110 to switch to the low power state (e.g., a low power state, an idle state, etc.). The flow 200 moves from block 208 to block 216 on determining that the WLAN allocated communication time interval is currently not in progress (i.e., that the LTE allocated communication time interval is in progress). The flow 200 moves from block 214 to block 216 after the WLAN device 110 broadcasts the control message to prevent WLAN communications during the LTE allocated communication time interval. For example, because of the CTS2SELF message transmitted at block 214, the WLAN device 110 does not transmit WLAN packets or receive WLAN packets when the WLAN allocated communication time interval is not in progress (i.e., during the LTE allocated communication time interval). From block 216, the flow loops back to block 208 where the WLAN coexistence unit 112 determines whether the WLAN allocated communication time interval has begun (i.e., when to switch to an active power state). It is noted that on determining (e.g., based on the WLAN coexistence timer) that the WLAN allocated communication time interval will begin, the WLAN coexistence unit 112 can transmit a control message to cause the processing components of the WLAN device 110 to switch to the active power state (e.g., an awake mode, a high power state, etc.).

Although FIG. 2 describes the WLAN device 110 switching to the low power state and not initiating WLAN communications during the LTE allocated communication time interval, embodiments are not so limited. In some implementations, the WLAN device 110 may be permitted to transmit messages that cannot be delayed until the WLAN allocated communication time interval begins ("emergency WLAN messages"). During the LTE allocated communication time interval, the WLAN device 110 may request the LTE device 102 for permission to transmit the emergency WLAN messages (e.g., WLAN beacon messages, high priority messages, immediate acknowledgement messages, etc.) by sending a coexistence message via the interface 120.

Figure 3:
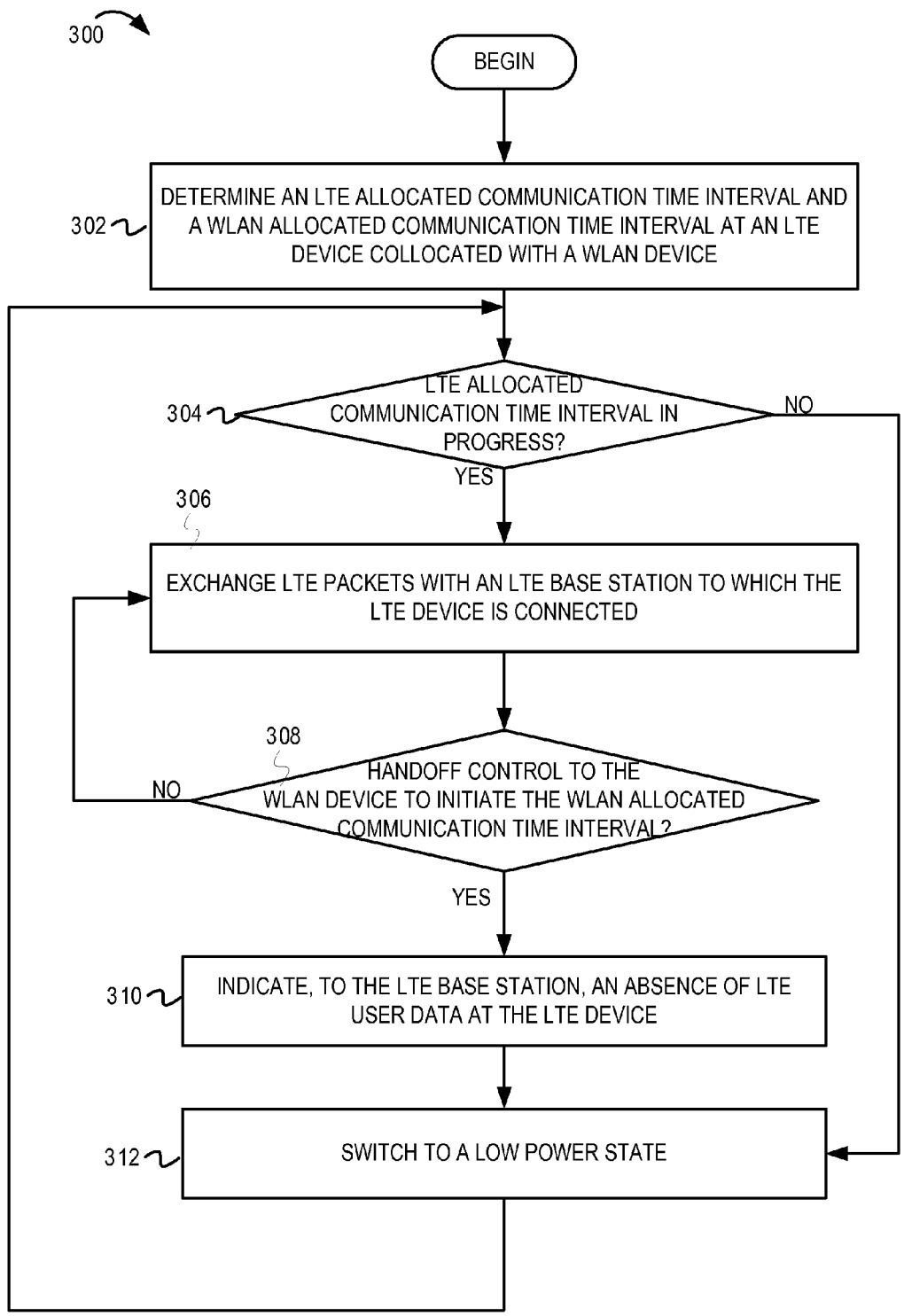
FIG. 3 is a flow diagram illustrating example operations of an LTE device configured to implement a time-splitting scheduling coexistence mechanism for control of the communication medium.

FIG. 3 is a flow diagram 300 illustrating example operations of an LTE device configured to implement a time-splitting scheduling coexistence mechanism for control of the communication medium. The flow 300 begins at block 302.

At block 302, an LTE allocated communication time interval and a WLAN allocated communication time interval are determined at an LTE device collocated with a WLAN device. In one implementation, as described with reference to FIG. 1, the LTE coexistence unit 104 can receive an indication of the LTE allocated communication time interval and the WLAN allocated communication time interval from the WLAN coexistence unit 112. As described above, the LTE allocated communication time interval and the WLAN allocated communication time interval can be successively alternating time intervals. The LTE device 102 and the WLAN device 110 may communicate during the LTE allocated communication time interval and the WLAN allocated communication time interval, respectively. The flow continues at block 304.

At block 304, it is determined whether the LTE allocated communication time interval is currently in progress. For example, the LTE coexistence unit 104 can determine whether the LTE allocated communication time interval is currently in progress. The LTE coexistence unit 104 can implement an LTE coexistence timer to determine whether the LTE allocated communication time interval is currently in progress. The LTE coexistence unit 104 and/or other processing components of the LTE device 102 may detect a trigger (based on the LTE coexistence timer) when the LTE allocated communication time interval begins or elapses. As will be described below, the LTE processing unit 106 may be permitted to transmit or receive LTE packets only during the LTE allocated communication time interval. If it is determined that the LTE allocated communication time interval is currently in progress, the flow continues at block 306. Otherwise, the flow continues at block 312.

At block 306, LTE packets are exchanged with an LTE base station to which the LTE device is connected. The flow 300 moves from block 304 to block 306 if the LTE coexistence unit 104 determines that the LTE allocated communication time interval is currently in progress. During the LTE allocated communication time interval, the LTE processing unit 106 can receive LTE packets from the LTE base station (also known as eNodeB). The LTE processing unit 106 can also transmit LTE packets to the LTE base station. In one implementation, the LTE processing unit 106 can determine (e.g., based on the LTE schedule information 108) a number of LTE packets that can be transmitted/received during the LTE allocated communication time interval. The flow continues at block 308.

At block 308, it is determined whether to handoff control to the WLAN device to initiate the WLAN allocated communication time interval. For example, the LTE coexistence unit 104 can determine whether to handoff control to the WLAN device 110 to initiate the WLAN allocated communication time interval. In one implementation, the LTE coexistence unit 104 can access the LTE coexistence timer to determine whether to handoff control to the WLAN device 110 to initiate the WLAN allocated communication time interval. In another implementation, the LTE coexistence timer may notify the LTE coexistence unit 104 just before the LTE allocated communication time interval elapses to enable the LTE device 102 to prevent subsequent LTE communications during the WLAN allocated communication time interval (as will be described below). If it is determined to handoff control to the WLAN device 110 to initiate the WLAN allocated communication time interval, the flow continues at block 310. Otherwise, the LTE device 102 retains control and the flow loops back to block 306 where the LTE device 102 can continue to communicate with the LTE base station.

At block 310, an absence of LTE user data at the LTE device is indicated to the LTE base station. The flow 300 moves from block 308 to block 310 if the LTE coexistence unit 104 determines to handoff control to the WLAN device 110 to initiate the WLAN allocated communication time interval. In preparation for the start of the WLAN allocated communication time interval, the LTE processing unit 106 can prevent transmission of LTE packets from the LTE device 102 to the LTE base station and can ensure that the LTE base station does not transmit LTE messages requesting LTE packets from the LTE device 102. The LTE processing unit 106 can transmit a control message to the LTE base station to indicate that the LTE device 102 has no LTE user data to transmit. It is noted that in some implementations, on determining to handoff control to the WLAN device 110, the LTE processing unit 106 can transmit a coexistence message to the WLAN device 110 (via the interface 120) to indicate the start of the WLAN allocated communication time interval. The flow continues at block 312.

At block 312, the LTE device switches to a low power state. For example, the LTE coexistence unit 104 can cause the LTE processing unit 106 and other processing components of the LTE device 102 to switch to the low power state (e.g., by sending a control signal). The flow 300 moves from block 304 to block 312 on determining that the LTE allocated communication time interval is currently not in progress. The flow 300 moves from block 310 to block 312 on determining that the LTE allocated communication time interval will elapse and that the WLAN allocated communication time interval will begin. The LTE device 102 may not transmit LTE packets or receive LTE packets when the LTE allocated communication time interval is not in progress (i.e., during the WLAN allocated communication time interval). From block 312, the flow loops back to block 304 where the LTE coexistence unit 104 determines whether the LTE allocated communication time interval has begun (i.e., when to switch to an active power state). In some implementations, on determining (e.g., based on the LTE coexistence timer) that the LTE allocated communication time interval will begin, the LTE coexistence unit 104 can cause the processing components of the LTE device 102 to switch to the active power state (e.g., by sending a control signal). It is noted, however, that in other implementations the LTE device 102 may be configured not to switch the low power state and may, instead, remain in the active power state during the WLAN allocated communication time interval.

Although FIG. 3 describes the LTE device 102 switching to the low power state and not initiating LTE communications during the WLAN allocated communication time interval, embodiments are not so limited. In some implementations, the LTE device 102 may be permitted to transmit messages that cannot be delayed until the LTE allocated communication time interval begins ("emergency LTE messages"). During the WLAN allocated communication time interval, the LTE device 102 may request the WLAN device 110 for permission to transmit the emergency LTE messages (e.g., high priority messages, immediate acknowledgement messages, etc.) by transmitting a coexistence message via the interface 120.

Also, although FIG. 3 describes the LTE device 102 switching to the low power state and preventing all LTE communications during the WLAN allocated communication time interval, embodiments are no so limited. In some implementations, when the LTE device 102 operates in a frequency division duplex (FDD) mode (e.g., using LTE Band 7 that is very close to the 2.4 GHz ISM band), the LTE device 102 may continue to receive LTE packets from the LTE base station during the WLAN allocated communication time interval and may only prevent LTE packet transmissions during the WLAN allocated communication time interval. When the LTE device 102 operates in the FDD mode, LTE packet reception may not interfere with WLAN communications because there may be sufficient frequency separation between an LTE packet reception frequency band and the 2.4 GHz ISM band to enable interference rejection. However, when the LTE device 102 operates in a time division duplex (TDD) mode, the LTE device 102 may prevent LTE packet transmissions and LTE packet receptions during the WLAN allocated communication time interval.

In some implementations, if the LTE device 102 receives an LTE packet from the LTE base station during the WLAN allocated communication time interval, the LTE device 102 may wait until the LTE allocated communication time interval to transmit an acknowledgement message to the LTE base station. In another implementation, however, the LTE device 102 may request the WLAN device 110 for permission to transmit an emergency LTE acknowledgement message via the interface 120 (as described above). In yet another implementation, the LTE device 102 may transmit the acknowledgement message as an inband control message at very low power. In another implementation, on receiving the LTE packet from the LTE base station during the WLAN allocated communication time interval, the LTE device 102 may transmit (without any delay) the acknowledgement message at very low power to the LTE base station via an LTE control channel. This can help minimize interference between the LTE device 102 and the WLAN device 110, when the LTE device transmits the acknowledgement message.

Furthermore, it is noted that although FIG. 2 and FIG. 3 describe the WLAN coexistence unit 112 determining the WLAN allocated communication time interval and the LTE allocated communication time interval, and notifying the LTE device 102 of the WLAN allocated communication time interval and the LTE allocated communication time interval, embodiments are not so limited. In some implementations, the LTE coexistence unit 104 can receive a coexistence message (e.g., from the WLAN coexistence unit 112) indicating the presence of the collocated WLAN device 110. In another implementation, the LTE coexistence unit 104 can access a predetermined memory location to determine whether the WLAN device 110 is collocated with the LTE device 102. The LTE coexistence unit 104 can be configured to determine the LTE allocated communication time interval and the WLAN allocated communication time interval. In some implementations, the WLAN coexistence unit 112 may communicate the WLAN schedule information 116 to the LTE coexistence unit 104. The LTE coexistence unit 104 can then determine the LTE allocated communication time interval and the WLAN allocated communication time interval based on the WLAN schedule information 116 and/or the LTE schedule information 108. Similarly as described above with reference to FIG. 2, in some implementations, the LTE coexistence unit 104 can also consider the WLAN beacon interval and the LTE frame interval when determining the LTE allocated communication time interval and the WLAN allocated communication time interval. The LTE coexistence unit 104 may then notify the WLAN coexistence unit 112 of the LTE allocated communication time interval and the WLAN allocated communication time interval. In another implementation, the LTE coexistence unit 104 and the WLAN coexistence unit 112 can be configured to exchange one or more coexistence messages via the coexistence interface 120 to negotiate the WLAN allocated communication time interval and the LTE allocated communication time interval.

Figure 4:
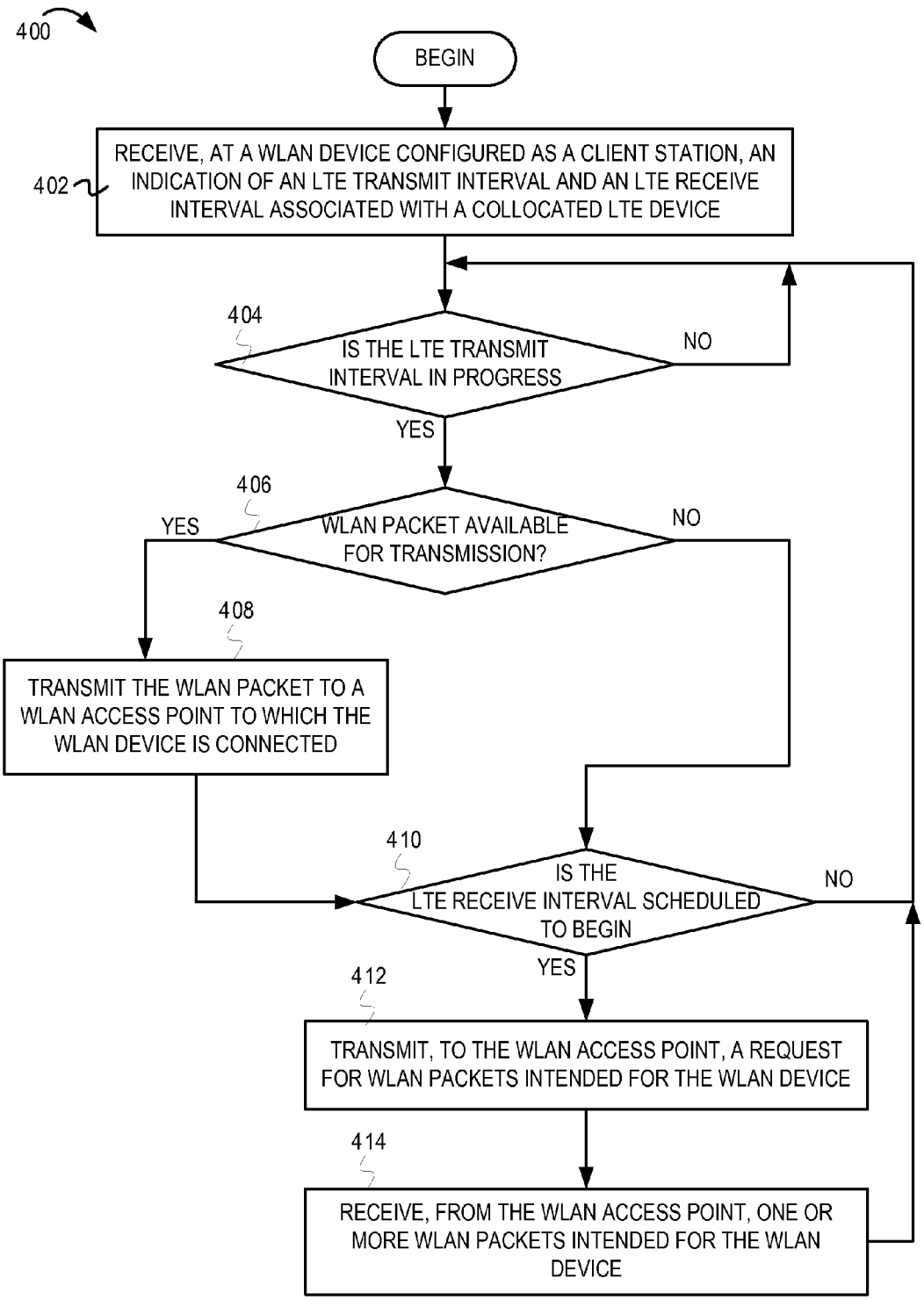
FIG. 4 is an example flow diagram illustrating example operations for scheduling WLAN communication in accordance with an LTE communication schedule.

FIG. 4 is an example flow diagram 400 illustrating example operations for scheduling WLAN communication in accordance with an LTE communication schedule. The flow 400 begins at block 402.

Figure 5A:
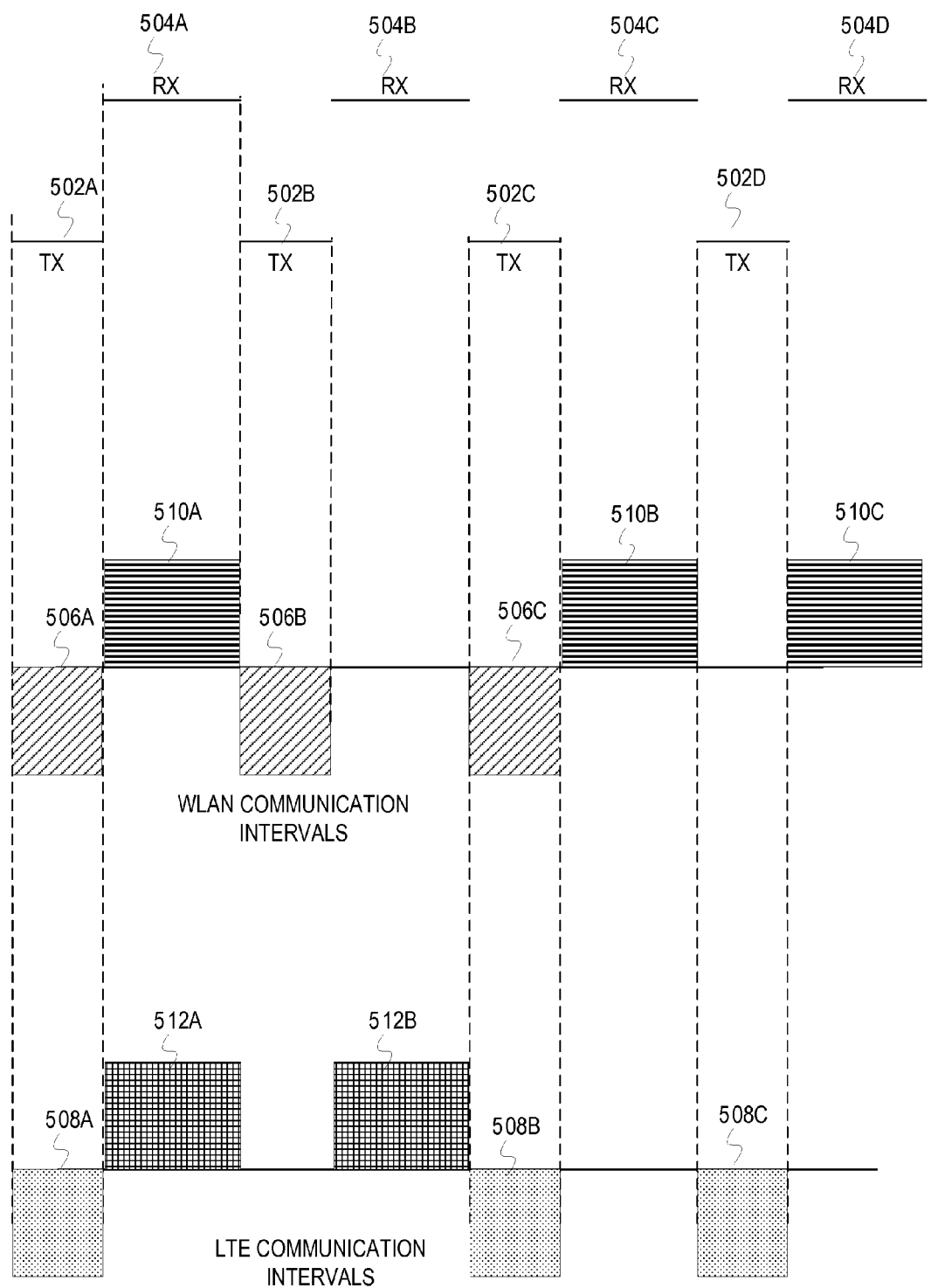
FIG. 5A is an example timing diagram illustrating scheduling WLAN communication in accordance with an LTE communication schedule.

At block 402, an indication of an LTE transmit interval and an LTE receive interval associated with an LTE device is received at a WLAN device from a collocated LTE device. With reference to FIG. 1, in some implementations, the WLAN coexistence unit 112 can receive the indication of the LTE transmit interval and the LTE receive interval from the LTE coexistence unit 104. Typically, the LTE device 102 may adhere to multiple communication slots and each communication slot may be split into a time interval during which the LTE device 102 can transmit (referred to herein as the "LTE transmit interval") and a time interval during which the LTE device 102 can receive (referred to herein as the "LTE receive interval"). FIG. 5A is an example timing diagram illustrating scheduling WLAN communication in accordance with an LTE communication schedule. FIG. 5A depicts the alternating LTE transmit intervals 502A-502D and LTE receive intervals 504A-504D. In one implementation, the communication slot may be 5 ms, the LTE transmit interval may be 2 ms, and the LTE receive interval may be 3 ms. Referring back to FIG. 4, in one implementation, the WLAN device 110 can be configured as a client WLAN device and can connect to a WLAN access point. As will be described below, the WLAN processing unit 114 can schedule WLAN transmissions during the LTE transmit interval and can schedule WLAN receptions during the LTE receive interval to minimize interference with LTE transmissions and LTE receptions. The flow continues at block 404.

At block 404, it is determined whether the LTE transmit interval is currently in progress. For example, the WLAN coexistence unit 112 can determine whether the LTE transmit interval is currently in progress. To minimize interference, the WLAN coexistence unit 112 can attempt to align WLAN transmissions with the LTE transmit interval. In other words, with reference to FIG. 5A, the WLAN processing unit 114 may transmit WLAN packets only during the LTE transmit intervals 502A-502D. On determining that the LTE transmit interval is not in progress, the WLAN coexistence unit 112 may automatically determine that the LTE receive interval is in progress (since the LTE transmit and receive intervals are consecutive and alternating intervals). In some implementations (as depicted in FIG. 4), on determining that the LTE transmit interval is not in progress, the WLAN device 110 can wait until the start of the next LTE transmit interval to transmit WLAN packets and to request (from the WLAN access point) for WLAN packets. In other implementations, on determining that the LTE transmit interval is not in progress, the WLAN device 110 can receive one or more WLAN packets from the WLAN access point (e.g., in response to a previously transmitted request for WLAN packets, etc.). With reference to FIG. 4, if it is determined that the LTE transmit interval is currently in progress, the flow continues at block 406. Otherwise, the flow loops back to block 410.

At block 406, it is determined whether WLAN packets are available for transmission to the WLAN access point. For example, the WLAN processing unit 114 can determine whether WLAN packets are scheduled to be transmitted to the WLAN access point. In one implementation, the WLAN processing unit 114 may access the WLAN schedule information 116 to determine whether there are any WLAN packets to be transmitted to the WLAN access point. In another implementation, the WLAN processing unit 114 may access a data transmit queue to determine whether there is any data to be transmitted to the WLAN access point. If the WLAN processing unit 114 determines that WLAN packets are available for transmission to the WLAN access point, the flow continues at block 408. Otherwise, the flow continues at block 410.

At block 408, the one or more WLAN packets are transmitted to the WLAN access point to which the WLAN device is connected. The flow 400 moves from block 406 to block 408 if the WLAN coexistence unit 112 determines that the LTE transmit interval is currently in progress and if the WLAN processing unit 114 determines that one or more WLAN packets are available for transmission. With reference to FIG. 5A, the WLAN processing unit 114 may transmit WLAN packets during the time intervals 502A, 502B, 502C, and 502D. It is noted that, in one implementation, the WLAN processing unit 114 may transmit the WLAN packets during the LTE transmit interval irrespective of whether the LTE device 102 is transmitting an LTE packet during the same time interval. In other words, the WLAN device 110 and the LTE device 102 may simultaneously transmit a WLAN packet and an LTE packet, respectively. As depicted in FIG. 5A, the WLAN device 110 and the LTE device 102 simultaneously transmit WLAN packet 506A and LTE packet 508A, respectively, during the LTE transmit interval 502A. The WLAN device 110 and the LTE device 102 simultaneously transmit WLAN packet 506C and LTE packet 508B, respectively, during the LTE transmit interval 502C. In another implementation, the WLAN processing unit 114 may transmit a WLAN packet during the LTE transmit interval only when the LTE device 102 is not transmitting an LTE packet. With reference to FIG. 5A, the WLAN processing unit 114 transmits WLAN packet 506B during the LTE transmit interval 502B, when the LTE device 102 does not transmit an LTE packet. The WLAN processing unit 114 does not transmit a WLAN packet during the LTE transmit interval 502D, when the LTE device 102 transmit LTE packet 508C. In some implementations (e.g., when the WLAN device implements 802.11b/g communication standards), the WLAN processing unit 114 may transmit only one WLAN packet within the LTE transmit interval so that the WLAN processing unit 114 can receive (in accordance with the 802.11b/g communication standards) an acknowledgement message for each WLAN packet transmitted. As will be described below, the WLAN processing unit 114 can schedule transmission of the WLAN packet towards the end of the LTE transmit interval so that the acknowledgment message for the transmitted WLAN packet is received (at the WLAN device 110) during the LTE receive interval. In other implementations (e.g., when the WLAN device 110 implements the 802.11n communication standard that incorporates block-ACK mechanisms), the WLAN processing unit 114 may transmit any suitable number of WLAN packets within the LTE transmit interval. In this implementation, the WLAN processing unit 114 can determine a number of WLAN packets that can be transmitted before the LTE transmit interval elapses. For example, the WLAN processing unit 114 may determine that two WLAN packets can be transmitted before the LTE transmit interval 502A elapses. After the WLAN packets are transmitted to the WLAN access point, the flow continues at block 410.

At block 410, it is determined whether the LTE receive interval is scheduled to begin. The flow 400 moves from block 408 to block 410 after the WLAN processing unit 114 transmits the WLAN packets to the WLAN access point. The flow 400 also moves from block 406 to block 410 if the WLAN processing unit 114 determines that there are no WLAN packets to be transmitted during the LTE transmit interval. To minimize interference, the WLAN coexistence unit 112 can attempt to align WLAN receptions with the LTE receive interval. In other words, with reference to FIG. 5A, the WLAN processing unit 114 may transmit WLAN packets only during the LTE transmit intervals 502A-502D. In determining whether the LTE receive interval (e.g., the LTE receive interval 504A) is scheduled to begin, the WLAN coexistence unit 112 can determine whether the LTE transmit interval (e.g., the LTE transmit interval 502A) will elapse within a predetermined time interval. In one implementation, the predetermined time interval can be configured based on an amount of time required to transmit (to the WLAN access point) a request for WLAN packets intended for the WLAN device 110. For example, if the WLAN device 110 uses a PSPoll message to request for WLAN packets intended for the WLAN device 110, the predetermined time interval may be equal to the transmission duration associated with the PSPoll message. If it is determined that the LTE receive interval is scheduled to begin, the flow continues at block 412. Otherwise, the flow loops back to block 404 where the WLAN coexistence unit 112 can determine whether WLAN packets are available for transmission to the WLAN access point during the LTE transmit interval.

Figure 5B:
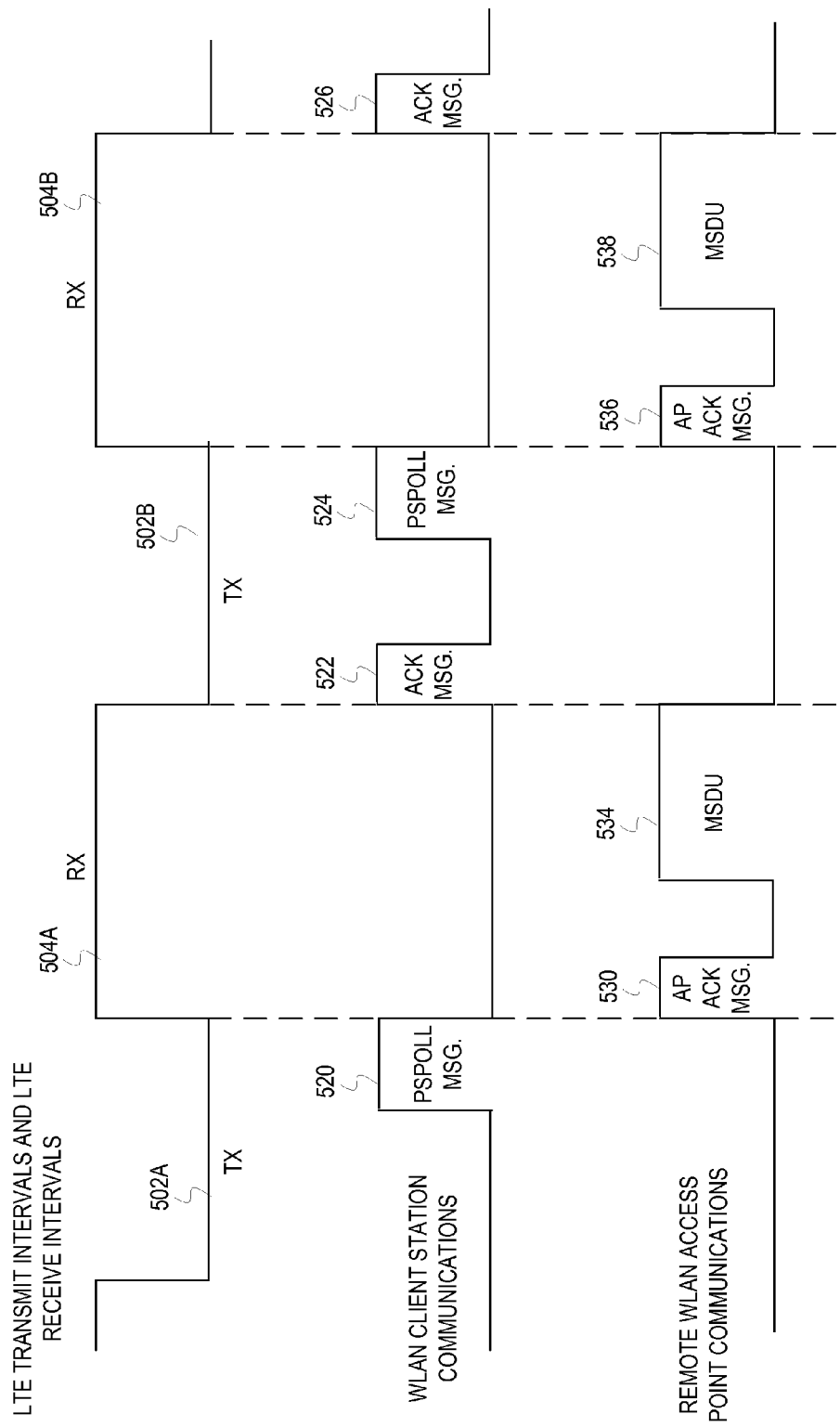
FIG. 5B is an example timing diagram illustrating a WLAN client station requesting WLAN packets from a remote WLAN access point.

At block 412, a request for WLAN packets intended for the WLAN device is transmitted to the WLAN access point. For example, in response to the WLAN coexistence unit 112 determining that the LTE receive interval is scheduled to begin, the WLAN processing unit 114 can query the WLAN access point to determine whether one or more WLAN packets are available for the WLAN device 110. In some implementations, on determining that the LTE receive interval is scheduled to begin, the WLAN coexistence unit 112 can cause the WLAN device 110 to switch to a power save mode and can cause the WLAN processing unit 114 to use a power save mechanism to pull (or receive) WLAN packets from the WLAN access point. As described below, with reference to FIG. 5B, the WLAN processing unit 114 can transmit PSPoll messages, Unscheduled Automatic Power Save Delivery (UAPSD) messages, NULL messages, etc. to request (from the WLAN access point) WLAN packets intended for the WLAN device 110. The WLAN processing unit 114 can control when to receive the WLAN packets from the WLAN access point and can, therefore, schedule WLAN receptions to coincide with the LTE receive interval. FIG. 5B is an example timing diagram illustrating the WLAN device 110 requesting WLAN packets from a remote WLAN access point. FIG. 5B depicts the LTE transmit intervals 502A and 502B and the LTE receive intervals 504A and 504B. Just before the LTE transmit interval 502A elapses, the WLAN device 110 transmits PSPoll message 520 to the WLAN access point to request WLAN packet, if any, from the WLAN access point. Transmitting the PSPoll message 520 just before the LTE transmit interval 502A elapses can ensure that acknowledgement message 530 from the WLAN access point is received (at the WLAN device 110) during the LTE receive interval 504A. During the LTE receive interval 504A, the WLAN access point also transmits WLAN packets 534 (e.g., MAC service data units (MSDU)) to the WLAN device 110. During the next LTE transmit interval 502B, the WLAN device 110 transmits acknowledgement message 522 to the WLAN access point and (towards the end of the LTE transmit interval 502B) transmits another PSPoll message 524 to the WLAN access point. During the next LTE receive interval 504B, the WLAN access point transmits an acknowledgement message 536 and WLAN packets 538 to the WLAN device 110. The WLAN device 110 transmits another acknowledgement message 526 during the next LTE transmit interval. The flow continues at block 414.

At block 414, one or more WLAN packets intended for the WLAN device are received from the WLAN access point. With reference to FIG. 5A, the WLAN processing unit 114 may receive WLAN packets (from the WLAN access point) during the LTE receive intervals 504A, 504B, 504C, and 504D. It is noted that, in one implementation, the WLAN processing unit 114 may receive the WLAN packets during the LTE receive intervals irrespective of whether the LTE device 102 is receiving an LTE packet during the same interval. In other words, the WLAN device 110 and the LTE device 102 may simultaneously receive a WLAN packet and an LTE packet, respectively. As depicted in FIG. 5A, the WLAN device 110 and the LTE device 102 simultaneously receive WLAN packet 510A and LTE packet 512A, respectively, during the LTE receive interval 504A. In another implementation, the WLAN processing unit 114 may receive a WLAN packet during the LTE receive interval only when the LTE device 102 is not receiving an LTE packet. With reference to FIG. 5A, the WLAN processing unit 114 receives WLAN packets 510B and 510C during the LTE receive intervals 504C and 504D respectively, when the LTE device 102 does not receive an LTE packet. The WLAN processing unit 114 does not receive a WLAN packet during the LTE receive interval 504B, when the LTE device 102 receives LTE packet 510B. After the WLAN packets (if any) are received from the WLAN access point, the flow loops back to block 404, where the WLAN coexistence unit 112 continues to determine whether the LTE transmit interval is in progress.

It is noted that in some implementations, the WLAN device 110 may be scheduled to receive a beacon message from the WLAN access point during an LTE transmit interval. The WLAN device 110 may indicate (to the LTE device 102) a time interval during which the WLAN device 110 expects to receive the beacon message from the WLAN access point. For example, the WLAN device 110 may notify the LTE device 102 (e.g., by transmitting a coexistence message via the interface 120) that the WLAN device 110 expects to receive a beacon message every 100 ms. The LTE device 102 can reschedule the LTE communications so as not to interfere with the WLAN device's reception of the beacon message. Furthermore, in some implementations, the WLAN device 110 can communicate (to the WLAN access point) an exact schedule of the time intervals during which the WLAN device 110 is permitted to transmit/receive WLAN packets. For example, with reference to FIG. 5A, the WLAN device 110 may indicate that it can transmit WLAN packets during the LTE transmit intervals 502A-502D of the WLAN allocated communication time interval and can receive WLAN packets during the LTE receive intervals 504A-504D. In another implementation, the WLAN device 110 may indicate a duration of the LTE transmit interval, a duration of the LTE receive interval, a periodicity of the LTE receive interval, and/or a periodicity of the LTE transmit interval. For example, the WLAN device 110 may indicate that it will transmit WLAN packets for 2 ms within each consecutive 5 ms interval.

Figure 6:
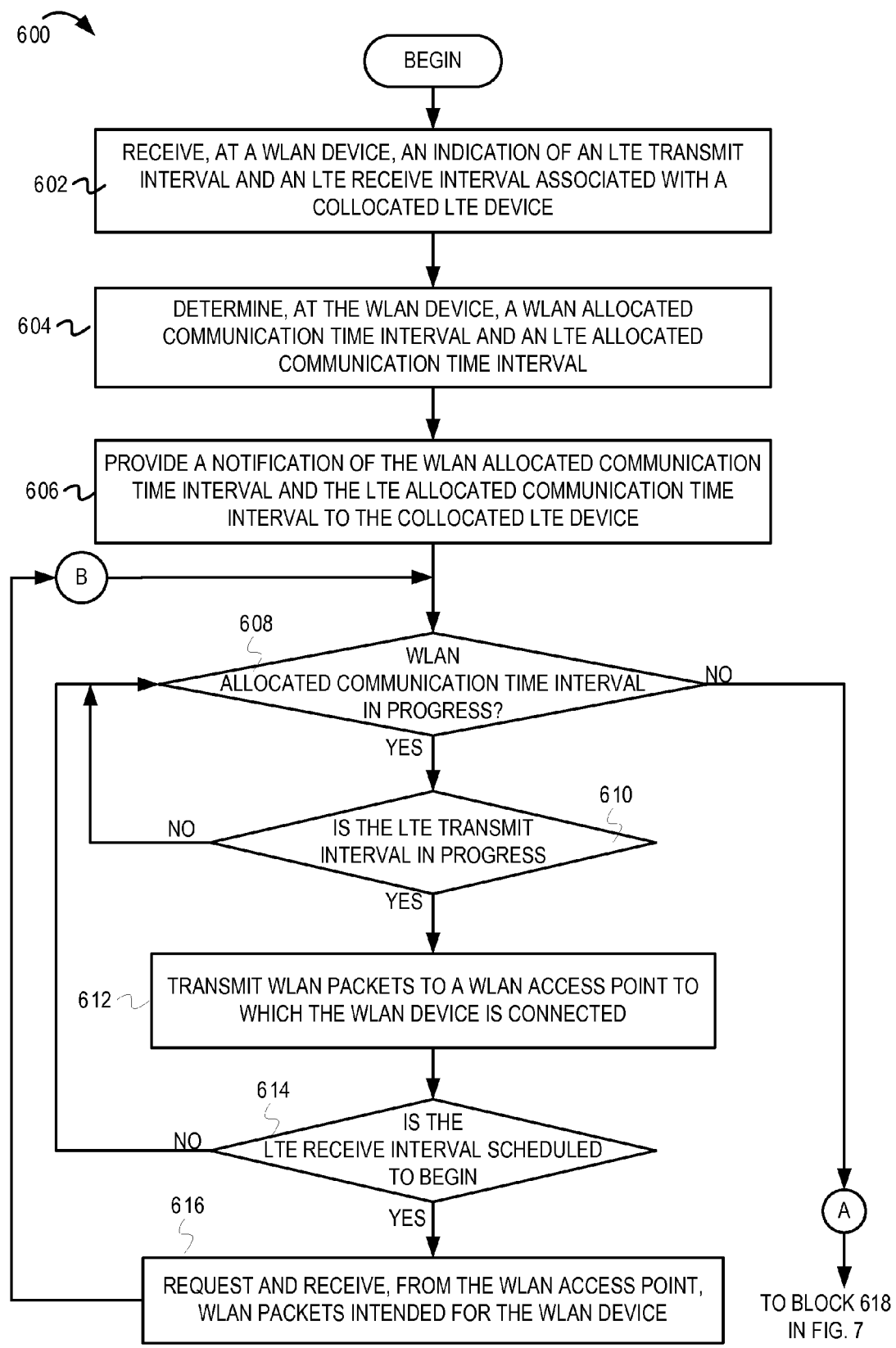
FIG. 6 is a flow diagram illustrating example operations for scheduling WLAN communication in accordance with an LTE communication schedule, while implementing a time-splitting scheduling coexistence mechanism.
Figure 7:
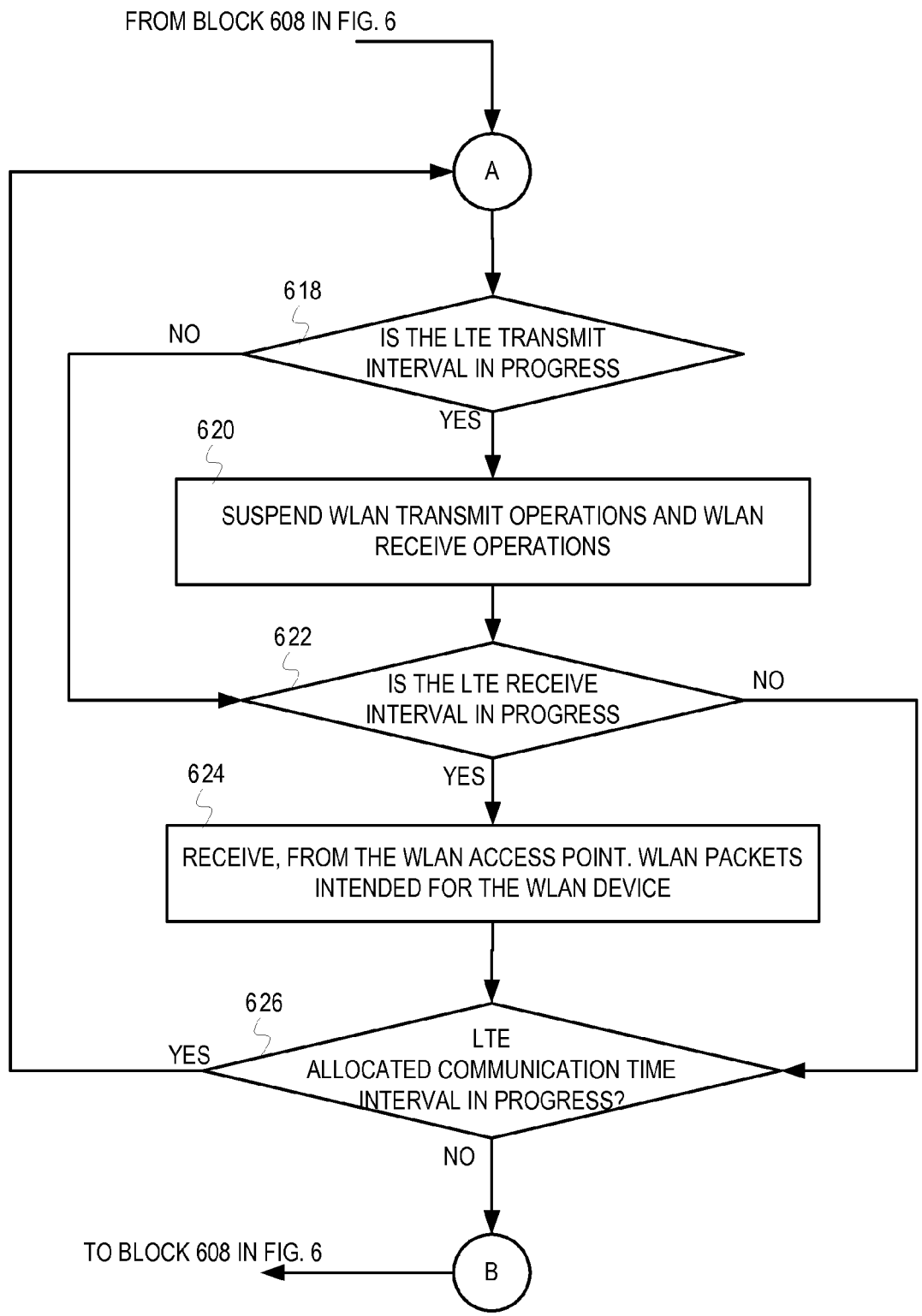
FIG. 7 is a continuation of FIG. 6 and also illustrates example operations for scheduling WLAN communication in accordance with an LTE communication schedule, while implementing a time-splitting scheduling coexistence mechanism.

FIG. 6 and FIG. 7 depict a flow diagram 600 illustrating example operations for scheduling WLAN communication in accordance with an LTE communication schedule while implementing a time-splitting scheduling coexistence mechanism. The flow 600 begins at block 602.

At block 602, a WLAN device receives an indication of an LTE transmit interval and an LTE receive interval from a collocated LTE device. With reference to FIG. 1, in some implementations, the WLAN coexistence unit 112 can receive the indication of the LTE transmit interval and the LTE receive interval from the LTE coexistence unit 104. In one implementation, the WLAN coexistence unit 112 can receive (from the LTE coexistence unit 104) a coexistence message via the interface 120 that indicates the presence of the collocated LTE device 102. The coexistence message can comprise the indication of the LTE transmit interval and the LTE receive interval. In some implementations, the LTE coexistence unit 104 may also provide the LTE schedule information 108 to the WLAN coexistence unit 112 in a coexistence message transmitted via the interface 120. The flow continues at block 604.

Figure 8:
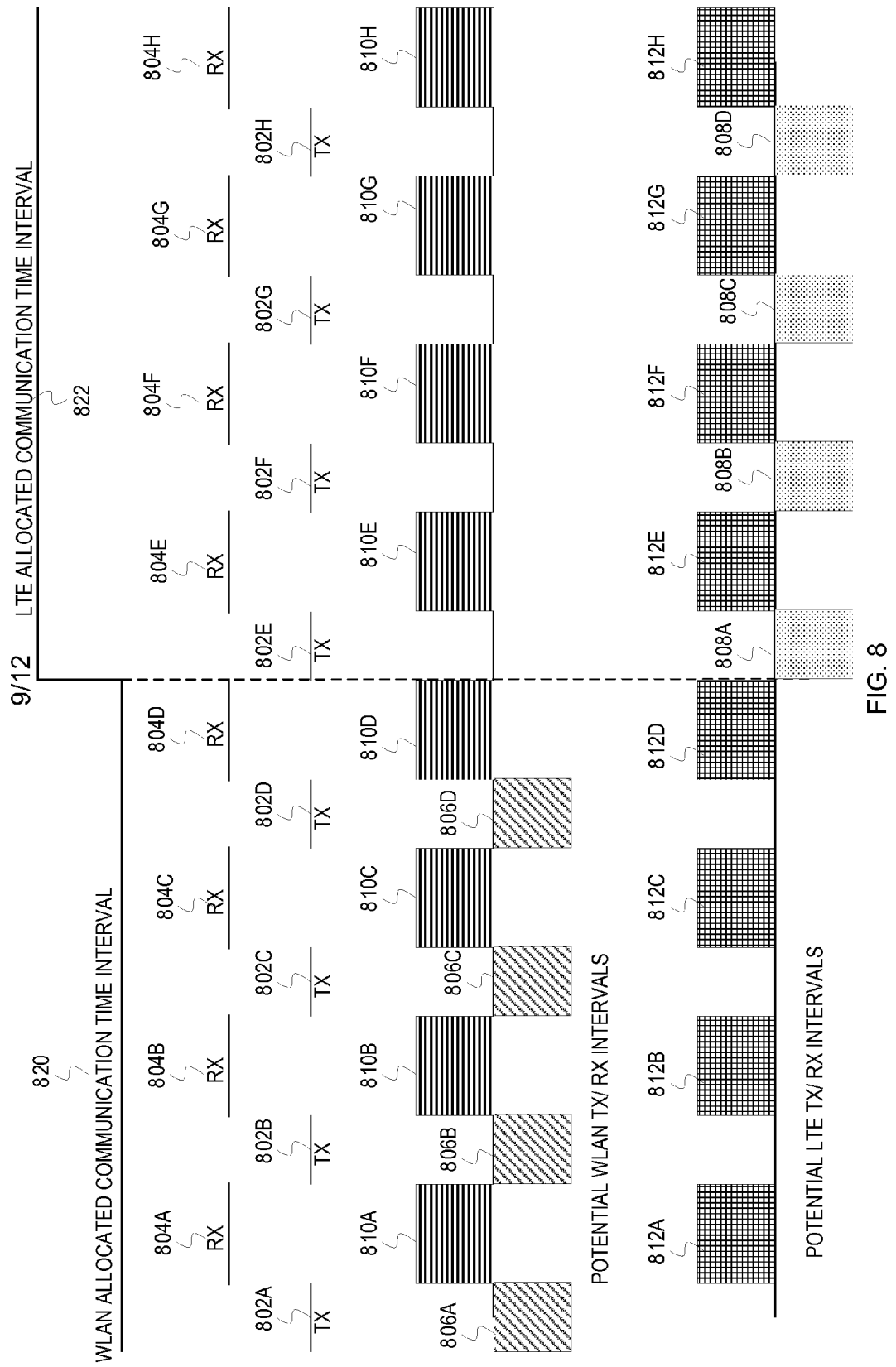
FIG. 8 is an example timing diagram illustrating potential time intervals for WLAN and LTE communications.

At block 604, a WLAN allocated communication time interval and an LTE allocated communication time interval are determined at the WLAN device. For example, the WLAN coexistence unit 112 can determine the WLAN allocated communication time interval and the LTE allocated communication time interval. The WLAN allocated communication time interval and the LTE allocated communication time interval may be determined based on one or more of the LTE transmit interval, the LTE receive interval, the LTE schedule information 108, the WLAN schedule information 116, a WLAN beacon interval, an LTE frame interval, etc. In other embodiments, the WLAN allocated communication time interval and the LTE allocated communication time interval may be predefined default values or may be dynamically configurable by the WLAN coexistence unit 112. In some implementations, the WLAN coexistence unit 112 may allot an equal amount of time for the WLAN allocated communication time interval and the LTE allocated communication time interval. In other implementations, however, the WLAN coexistence unit 112 may allot different amounts of time for the WLAN allocated communication time interval and the LTE allocated communication time interval. As described above, the WLAN allocated communication time interval and the LTE allocated communication time interval can be consecutive and periodically repeating time intervals allotted to the WLAN device 110 and the LTE device 102 for their respective communications. For example, a 20 ms time interval may be allocated to the WLAN device 110 for WLAN transmissions and WLAN receptions. The next consecutive 20 ms time interval may be allocated to the LTE device 102 for LTE transmissions and LTE receptions. With reference to FIG. 8, the LTE coexistence unit 104 can indicate the LTE transmit intervals 802A-802H and the LTE receive intervals 804A-804H. The WLAN coexistence unit 112 can determine that the WLAN allocated communication time interval 820 and the LTE allocated communication time interval 822 each comprise four LTE transmit intervals and four LTE receive intervals. In the example shown in FIG. 8, the WLAN allocated communication time interval 820 comprises the LTE transmit intervals 802A-802D and the LTE receive intervals 804A-804D. The LTE allocated communication time interval 822 comprises the LTE transmit intervals 802E-802H and the LTE receive intervals 804E-804H. As will be described below, during the WLAN allocated communication time interval 820, the WLAN processing unit 114 can schedule WLAN transmissions to coincide with the LTE transmit intervals 802A-802D and can schedule WLAN receptions to coincide with the LTE receive intervals 804A-804D. The flow continues at block 604. The flow continues at block 606.

At block 606, a notification of the WLAN allocated communication time interval and the LTE allocated communication time interval is provided to the collocated LTE device. For example, the WLAN coexistence unit 112 can provide the notification of the WLAN allocated communication time interval 820 and the LTE allocated communication time interval 822 to the LTE coexistence unit 104 by transmitting a coexistence message via the interface 120. The WLAN coexistence unit 112 may also indicate a time instant at which the LTE allocated communication time interval is scheduled to start or a time interval after which the LTE allocated communication time interval will start. The flow continues at block 608.

At block 608, it is determined whether the WLAN allocated communication time interval is currently in progress. For example, the WLAN coexistence unit 112 can determine whether the WLAN allocated communication time interval 820 is currently in progress. As described above, the WLAN processing unit 114 may be permitted to transmit WLAN packets only during the WLAN allocated communication time interval 820. If it is determined that the WLAN allocated communication time interval 820 is currently in progress, the flow continues at block 610. Otherwise, the flow continues at block 618 in FIG. 7.

At block 610, it is determined whether the LTE transmit interval is currently in progress. For example, the WLAN coexistence unit 112 can determine whether the LTE transmit interval 802A-802D is currently in progress in response to determining that the WLAN allocated communication time interval 820 is currently in progress. To minimize interference, the WLAN coexistence unit 112 can attempt to transmit WLAN packets during the LTE transmit interval 802A-802D of the WLAN allocated communication time interval 820. In some implementations (as depicted in FIG. 6), on determining that the LTE transmit interval is not in progress, the WLAN coexistence unit 112 can determine whether the WLAN allocated communication time interval is still in progress. In other implementations, on determining that the LTE transmit interval is not in progress, the WLAN coexistence unit 112 may automatically determine that the LTE receive interval is in progress (since the LTE transmit and receive intervals are consecutive and alternating intervals). The WLAN processing unit 114 can then receive one or more WLAN packets from the WLAN access point (e.g., in response to a previously transmitted request for WLAN packets, etc.). In another implementation, on determining that the LTE transmit interval is not in progress, the WLAN device 110 can wait until the start of the next LTE transmit interval of the WLAN allocated communication time interval 820 to transmit WLAN packets and to request (from the WLAN access point) for WLAN packets. With reference to FIG. 6, if it is determined that the LTE transmit interval 802A-802D is currently in progress, the flow continues at block 612. Otherwise, the flow loops back to block 608.

At block 612, one or more WLAN packets are transmitted to a WLAN access point to which the WLAN device is connected. The flow 600 moves from block 610 to block 612 if the WLAN coexistence unit 112 determines that the LTE transmit interval 802A-802D is currently in progress within the WLAN allocated communication time interval 820. FIG. 8 depicts time intervals during which the WLAN processing unit 114 could potentially transmit WLAN packets. In FIG. 8, the WLAN processing unit 114 could transmit WLAN packets 806A, 806B, 806C, and 806D during LTE transmit intervals 802A, 802B, 802C, and 802D, respectively. In some implementations, the WLAN processing unit 114 can determine whether one or more WLAN packets are available for transmission to the WLAN access point. If so, the WLAN processing unit 114 can determine a number of WLAN packets that can be transmitted before the LTE transmit interval of the WLAN allocated communication time interval 820 elapses. For example, the WLAN processing unit 114 may determine that only one WLAN packet can be transmitted before the LTE transmit interval 802A elapses. It should be noted that in some implementations, the WLAN device 110 may implement the 802.11n communication standards but may be connected to a remote WLAN access point that implements an older version of the 802.11 communication standards (e.g., 802.11b/g communication standards). In this implementation, the WLAN device 110 can stop transmitting WLAN packets just before the LTE receive interval (e.g., 804A, 804B, 804C, or 804D) begins. This can enable the remote WLAN access point to provide an acknowledgement message during the LTE receive interval (i.e., so that the WLAN device 110 can receive the acknowledgement message during the LTE receive interval). After the WLAN packets, if any, are transmitted to the WLAN access point, the flow continues at block 614.

At block 614, it is determined whether the LTE receive interval is scheduled to begin. The flow 600 moves from block 612 to block 614 after the WLAN processing unit 114 transmits WLAN packets to the WLAN access point (or if the WLAN processing unit 114 determines that there are no WLAN packets to be transmitted). As described above, in determining whether the LTE receive interval (e.g., the LTE receive interval 804A) of the WLAN allocated communication time interval 820 is scheduled to begin, the WLAN coexistence unit 112 can determine whether the LTE transmit interval (e.g., the LTE transmit interval 802A) will elapse within a predetermined time interval (e.g., the transmission duration associated with a PSPoll message). If it is determined that the LTE receive interval 804A-804D of the WLAN allocated communication time interval 820 is scheduled to begin, the flow continues at block 616. Otherwise, the flow loops back to block 608 where the WLAN coexistence unit 112 can determine whether the WLAN allocated communication time interval 820 and the LTE transmit interval 802A-802D are currently in progress.

At block 616, WLAN packets intended for the WLAN device are requested and received from the WLAN access point. To minimize interference with the LTE device 102, the WLAN processing unit 114 can attempt to receive WLAN packets during the LTE receive interval 804A-804D of the WLAN allocated communication time interval 820. FIG. 8 depicts time intervals during which the WLAN processing unit 114 can potentially receive WLAN packets. During the WLAN allocated communication time interval 820, the WLAN processing unit 114 can receive WLAN packets 810A, 810B, 810C, and 810D during receive intervals 804A, 804B, 804C, and 804D, respectively. In some implementations, as depicted in FIG. 8, the WLAN processing unit 114 may receive WLAN packets 810A-810D even when the LTE device 102 is scheduled to receive LTE packets 812A-812D (i.e., simultaneous WLAN and LTE reception) during the receive intervals 804A-804D. In other implementations, the WLAN processing unit 114 may receive the WLAN packets only when the LTE device 102 is not scheduled to receive an LTE packet. As described above with reference to FIG. 5B, the WLAN processing unit 114 can query the WLAN access point (e.g., by transmitting a PSPoll message) just before the LTE transmit interval 802A-802D of the WLAN allocated communication time interval 820 elapses to determine whether one or more WLAN packets (intended for the WLAN device 110) are available at the WLAN access point. This can ensure that the WLAN processing unit 114 receives WLAN packets (or a notification that there are no WLAN packets intended for the WLAN device 110) during the LTE receive intervals 804A-804D of the WLAN allocated communication time interval 820. From block 616, the flow loops back to block 608 where the WLAN coexistence unit 112 determines whether the WLAN allocated communication time interval 820 is still in progress.

At block 618 of FIG. 7, it is determined whether the LTE transmit interval of the LTE allocated communication time interval is currently in progress. The flow 600 moves from block 608 in FIG. 6 to block 618 in FIG. 7 on determining that the WLAN allocated communication time interval 820 is not in progress (i.e., that the LTE allocated communication time interval 822 is in progress). For example, the WLAN coexistence unit 112 can determine whether the LTE transmit interval 802E-802H of the LTE allocated communication time interval 822 is currently in progress. If it is determined that the LTE transmit interval 802E-802H is currently in progress, the flow continues at block 620. Otherwise, the flow continues at block 622, where the WLAN coexistence unit 112 can determine whether the LTE receive interval 804E-804H of the LTE allocated communication time interval 822 is in progress.

At block 620, WLAN transmit operations and WLAN receive operations are suspended at the WLAN device. For example, the WLAN coexistence unit 112 can cause the WLAN processing unit 114 to suspend the WLAN transmit operations and the WLAN receive operations. If the WLAN device 110 is configured as a client WLAN device, the WLAN processing unit 114 can prevent WLAN transmissions during the LTE allocated communication time interval. Also, the WLAN processing unit 114 may not prompt (e.g., by transmitting a PSPoll message) the WLAN access point to transmit WLAN packets intended for the WLAN device 110. In other words, the WLAN coexistence unit 112 can ensure that WLAN device 110 is not transmitting or receiving WLAN packets when the LTE device 102 is programmed to transmit LTE packets. FIG. 8 depicts time intervals during which the WLAN processing unit 114 may be prevented from transmitting or receiving WLAN packets. In FIG. 8, the WLAN processing unit 114 is prevented from transmitting or receiving WLAN packets during LTE transmit intervals 802E, 802F, 802G, and 802H of the LTE allocated communication time interval 822. The flow continues at block 622.

At block 622, it is determined whether the LTE receive interval is currently in progress. The flow 600 also moves from block 618 to block 624 if the WLAN coexistence unit 112 determines that the LTE transmit interval 802E-802H of the LTE allocated communication time interval 822 is not currently in progress. If the WLAN coexistence unit 112 determines that the LTE receive interval 804E-804H is currently in progress, the flow continues at block 624. Otherwise, the flow continues at block 626 where the WLAN coexistence unit 112 can determine whether the LTE transmit interval 822 is still in progress.

At block 624, WLAN packets intended for the WLAN device are received from the WLAN access point. Although the WLAN processing unit 114 may not be permitted to transmit WLAN packets during the LTE transmit interval 802E-802H of the LTE allocated communication time interval 822, the WLAN processing unit 114 may be permitted to receive WLAN packets during the LTE receive intervals 804E-804H of the LTE allocated communication time interval 822. As depicted in FIG. 8, the WLAN processing unit 114 can potentially receive WLAN packets 810E, 810F, 810G, and 810H during LTE receive intervals 804E, 804F, 804G, and 804H, respectively, during the LTE allocated communication time interval 822. In some embodiments, the WLAN device 110 may be permitted to receive WLAN packets during the LTE receive intervals 804E-804H of the LTE allocated communication time interval 822 only if the WLAN access point (to which the WLAN device 110 is connected) supports block acknowledgements (e.g., when the WLAN device 110 implements the IEEE 802.11n communication standard that incorporates block-ACK mechanisms). This is because when the WLAN device 110 and the WLAN access point support block-ACK, the WLAN access point does not expect to receive an acknowledgement message for each WLAN packet. The WLAN device 110, therefore, can receive WLAN packets from the WLAN access point during the LTE receive intervals 804E-804H of the LTE allocated communication time interval 822 and can transmit one acknowledgement message during the WLAN communication time interval. The flow continues at block 626.

At block 626, it is determined whether the LTE allocated communication time interval is in progress. For example, the WLAN coexistence unit 112 can determine whether the LTE allocated communication time interval 822 is in progress. If it is determined that the LTE allocated communication time interval 822 is in progress, the flow continues at block 618 where the WLAN coexistence unit 112 determines whether the LTE transmit interval 802E-802H is in progress. If it is determined the LTE allocated communication time interval 822 is not in progress, the flow continues at block 608 in FIG. 6 where the WLAN coexistence unit 112 determines whether the WLAN allocated communication time interval 820 is in progress (and the LTE allocated communication time interval 822 has elapsed).

Although FIG. 6 and FIG. 7 describe operations of the WLAN device 110 when the WLAN device 110 is configured as a WLAN client device connected to a WLAN access point, embodiments are not so limited. In implementations where the WLAN device 110 is configured as a WLAN access point, the WLAN processing unit 114 can determine or receive a notification (e.g., during the WLAN allocated communication time interval 820) to handoff control to the LTE device 102 to initiate the LTE allocated communication time interval 822 by transmitting a coexistence message via the interface 120. Accordingly, as described with reference to FIG. 2, the WLAN device 110 can broadcast a CTS2SELF control message to other WLAN devices to prevent WLAN communication. The WLAN device 110 can switch to the low power state where it neither transmits WLAN packets nor receives WLAN packets. Also, when the WLAN device 110 is configured as a WLAN access point, the WLAN device 110 can transmit WLAN packets to one or more connected WLAN devices (at block 612) and can receive WLAN packets from the one or more connected WLAN devices (at block 616). Furthermore, in some implementations, the WLAN device 110 can communicate to the WLAN access point (if the WLAN device 110 is configured as a client station), or to connected WLAN stations (if the WLAN device 110 is configured as a WLAN access point), the time intervals during which the WLAN device 110 is permitted to transmit/receive WLAN packets. For example, the WLAN device 110 may indicate that it can transmit WLAN packets during the LTE transmit intervals 802A-802D of the WLAN allocated communication time interval and can receive WLAN packets during the LTE receive intervals 804A-804D.

Although not described with reference to FIGS. 6-7, the LTE device 102 can also be configured to implement operations described in the flow 600 to determine whether/when to transmit and receive LTE packets. The LTE device 102 can be configured to operate in either the TDD mode (e.g., using LTE Band 40) or the FDD mode (e.g., using LTE Band 7). The LTE coexistence unit 104 can determine the presence of the collocated WLAN device 110 (e.g., based on a coexistence message received via the interface 120). In some implementations, the LTE coexistence unit 104 can provide the LTE schedule information 108 to the WLAN coexistence unit 112 and can receive (via the interface 120) an indication of the WLAN allocated communication time interval and the LTE allocated communication time interval from the WLAN coexistence unit 112. In another implementation, the LTE coexistence unit 104 can receive, via the interface 120, the WLAN schedule information 116 from the WLAN device 110. Accordingly, the LTE coexistence unit 104 can determine the WLAN allocated communication time interval and the LTE allocated communication time interval. The LTE coexistence unit 104 can then provide the indication of WLAN allocated communication time interval and the LTE allocated communication time interval to the WLAN device 110. In yet another implementation, the LTE coexistence unit 104 can receive the WLAN communication interval from the WLAN device 110 and can accordingly determine the LTE allocated communication time interval. With reference to FIG. 8, the LTE device 102 can determine to communicate during the LTE allocated communication time interval 822. The LTE coexistence unit 104 can also determine the LTE transmit intervals 802E-802H and the LTE receive intervals 804E-804H that fall within the LTE communication time interval 822.

The LTE coexistence unit 104 can determine whether the LTE allocated communication time interval 822 is currently in progress to determine whether the LTE processing unit 106 is permitted to transmit LTE packets. If the LTE allocated communication time interval 822 is currently in progress, the LTE coexistence unit 104 can determine whether one of the LTE transmit intervals 802E-802H is currently in progress. The LTE device 102 can transmit LTE packets 808A, 808B, 808C, and 808D (to the LTE base station) during the LTE transmit intervals 802E, 802F, 802G, and 802H, respectively, of the LTE allocated communication time interval 822. In some implementations, the LTE processing unit 106 can determine whether one or more LTE packets are available for transmission to the LTE base station. If so, the LTE processing unit 106 can determine a number of LTE packets that can be transmitted before the LTE transmit interval of the LTE allocated communication time interval 822 elapses. In this implementation, the LTE processing unit 106 can stop transmitting the LTE packets just before the LTE receive interval (e.g., 804E, 804F, 804G, or 804H) begins. This can enable the LTE base station to provide an acknowledgement message during the LTE receive interval (i.e., so that the LTE processing unit 106 can receive the acknowledgement message during the LTE receive interval). If one of the LTE transmit intervals 802E-802H is currently not in progress, the LTE coexistence unit 104 may automatically determine that one of the LTE receive intervals 804E-804H is in progress (since the LTE transmit and receive intervals are consecutive and alternating intervals). The LTE device 102 can receive LTE packets 812E, 812F, 812G, and 812H (from the LTE base station) during the LTE receive intervals 804E, 804F, 804G, and 804H, respectively, of the LTE allocated communication time interval 822.

The LTE coexistence unit 104 can also determine whether the LTE allocated communication time interval 822 is scheduled to elapse within a predetermined time interval (i.e., whether the WLAN allocated communication time interval 820 is scheduled to begin). The predetermined time interval can be selected as a time duration required (by the LTE processing unit 106) to transmit a control message (to the LTE base station) indicating an absence of LTE user data for transmission to the LTE base station. On determining that the WLAN allocated communication time interval 820 is scheduled to begin, the LTE processing unit 106 can transmit the control message to the LTE base station. The LTE device 102 may not transmit LTE packets during the LTE transmit intervals 802A-802D of the WLAN allocated communication time interval 820. In some implementations, the LTE device 102 may not receive LTE packets during the LTE receive intervals 804A-804D of the WLAN allocated communication time interval 820. However, in other implementations as depicted in FIG. 8, the LTE device 102 may be permitted to receive LTE packets 812A, 812B, 812C, and 812D (from the LTE base station) during the LTE receive intervals 804A, 804B, 804C, and 804D of the WLAN allocated communication time interval 820. In other words, the WLAN processing unit 114 and the LTE processing unit 106 may simultaneously receive WLAN packets and LTE packets, respectively, during any LTE receive interval. In other implementations, the LTE processing unit 106 may receive LTE packets during the WLAN allocated communication time interval 820 only if the WLAN processing unit 114 is not scheduled to receive WLAN packets. Furthermore, in some implementations, the LTE device 102 may operate in a power save mode. The LTE device 102 may indicate, to the LTE base station, the LTE transmit intervals 802E-802H and the LTE receive intervals 804E-804H during which the LTE device can transmit and receive LTE packets, respectively. Accordingly, the LTE base station can transmit LTE packets to the LTE device 102 during the LTE receive intervals 804E-804H.

Figure 9:
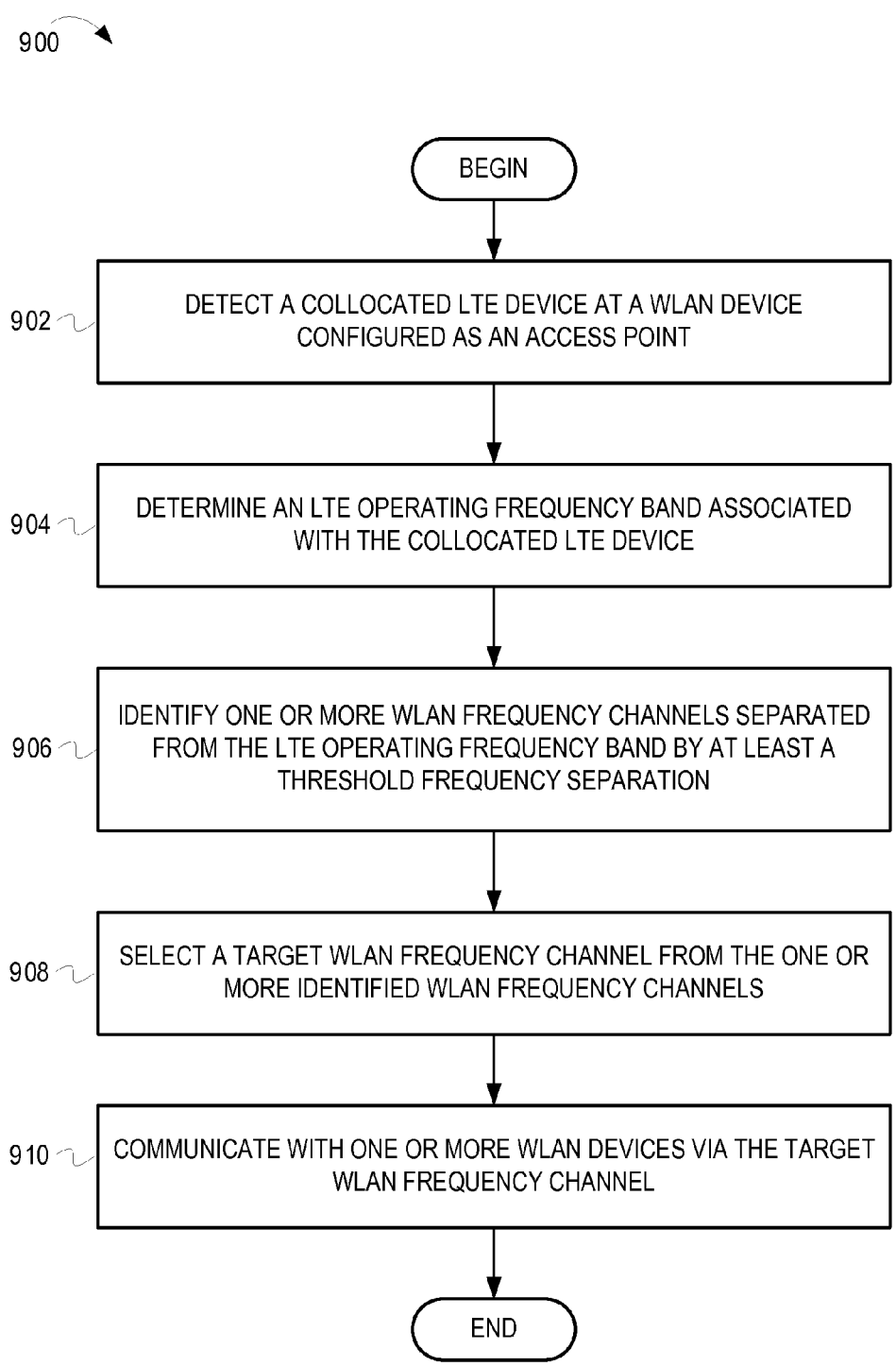
FIG. 9 is a flow diagram illustrating example operations for maximizing frequency separation between a WLAN device and a collocated LTE device when the WLAN device is configured as an access point.

FIG. 9 is a flow diagram 900 illustrating example operations for maximizing frequency separation between a WLAN device and a collocated LTE device when the WLAN device is configured as an access point. The flow 900 begins at block 902.

At block 902, a collocated LTE device is detected at a WLAN device configured as an access point. In one implementation, with reference to FIG. 1, the WLAN coexistence unit 112 can receive a control signal (from the LTE coexistence unit 104) identifying the collocated LTE device 102. For example, the control signal may be a digital signal (or a coexistence message) transmitted via the interface 120. As another example, the control signal may be a voltage level transmitted via a physical wire. In another implementation, the WLAN coexistence unit 112 can access a predetermined location (e.g., read a flag bit) to determine whether the LTE device 102 is collocated with the WLAN device 110 and/or whether the collocated LTE device 102 is enabled. The flow continues at block 904.

At block 904, an LTE operating frequency band associated with the collocated LTE device is determined. For example, the WLAN coexistence unit 112 can determine the LTE operating frequency band associated with the collocated LTE device. In some implementations, the WLAN coexistence unit 112 can receive, as part of the control signal or the coexistence message (received at block 902), an indication of the LTE operating frequency band. In another implementation, the WLAN coexistence unit 112 may access a predetermined location to determine the LTE operating frequency band associated with the collocated LTE device 102. The flow continues at block 906.

At block 906, one or more WLAN frequency channels separated from the LTE operating frequency band by at least a threshold frequency separation are identified. For example, the WLAN coexistence unit 112 can identify one or more WLAN frequency channels separated from the LTE operating frequency band by at least the threshold frequency separation. For example, the collocated LTE device 102 may use LTE band 7 associated with an LTE operating frequency band of 2.5 GHz to 2.69 GHz. If the threshold frequency separation is selected to be 68 MHz, the WLAN coexistence unit 112 can identify WLAN frequency channels 1-5 with WLAN operating frequencies 2.412 GHz-2.432 GHz. The flow continues at block 908.

At block 908, a target WLAN frequency channel is selected from the one or more identified WLAN frequency channels. For example, the WLAN coexistence unit 112 can select the target WLAN frequency channel from the one or more identified WLAN frequency channels. In one implementation, the WLAN coexistence unit 112 can select the target WLAN frequency channel as one with a WLAN operating frequency that is farthest from the LTE operating frequency band. With reference to the above example, if the collocated LTE device 102 uses LTE band 7, the WLAN coexistence unit 112 may select WLAN frequency channel 1 (with WLAN operating frequency of 2.412 GHz) as the target WLAN frequency channel. In another implementation, the WLAN coexistence unit 112 can select (as the target WLAN frequency channel) any one of WLAN frequency channels with a WLAN operating frequency that is separated from the LTE operating frequency band by at least the threshold frequency separation. In selecting the target WLAN frequency channel, the WLAN coexistence unit 112 can also take interference/noise sources into consideration. For example, if the WLAN frequency channel that is the farthest from the LTE operating frequency band (e.g., the WLAN frequency channel 1) has a lot of noise and interference, the WLAN coexistence unit 112 may select the WLAN frequency channel 2 (or another frequency channel) as the target WLAN frequency channel. In other words, the WLAN coexistence unit 112 can select the target WLAN frequency channel to maintain an optimal balance between sufficient frequency separation from the LTE operating frequency band associated with the collocated LTE device 102 and noise/interference on the WLAN frequency channels. The flow continues at block 910.

At block 910, the target WLAN frequency channel is used for communication with one or more WLAN devices. For example, the WLAN coexistence unit 112 can cause the WLAN device 110 (e.g., the WLAN processing unit 114) to communicate with one or more other WLAN devices via the target WLAN frequency channel. For example, the WLAN processing unit 114 can broadcast beacon messages, advertise the existence of the WLAN device 110, and initiate subsequent communications with other WLAN devices via the target WLAN frequency channel. From block 910, the flow ends.

Figure 10:
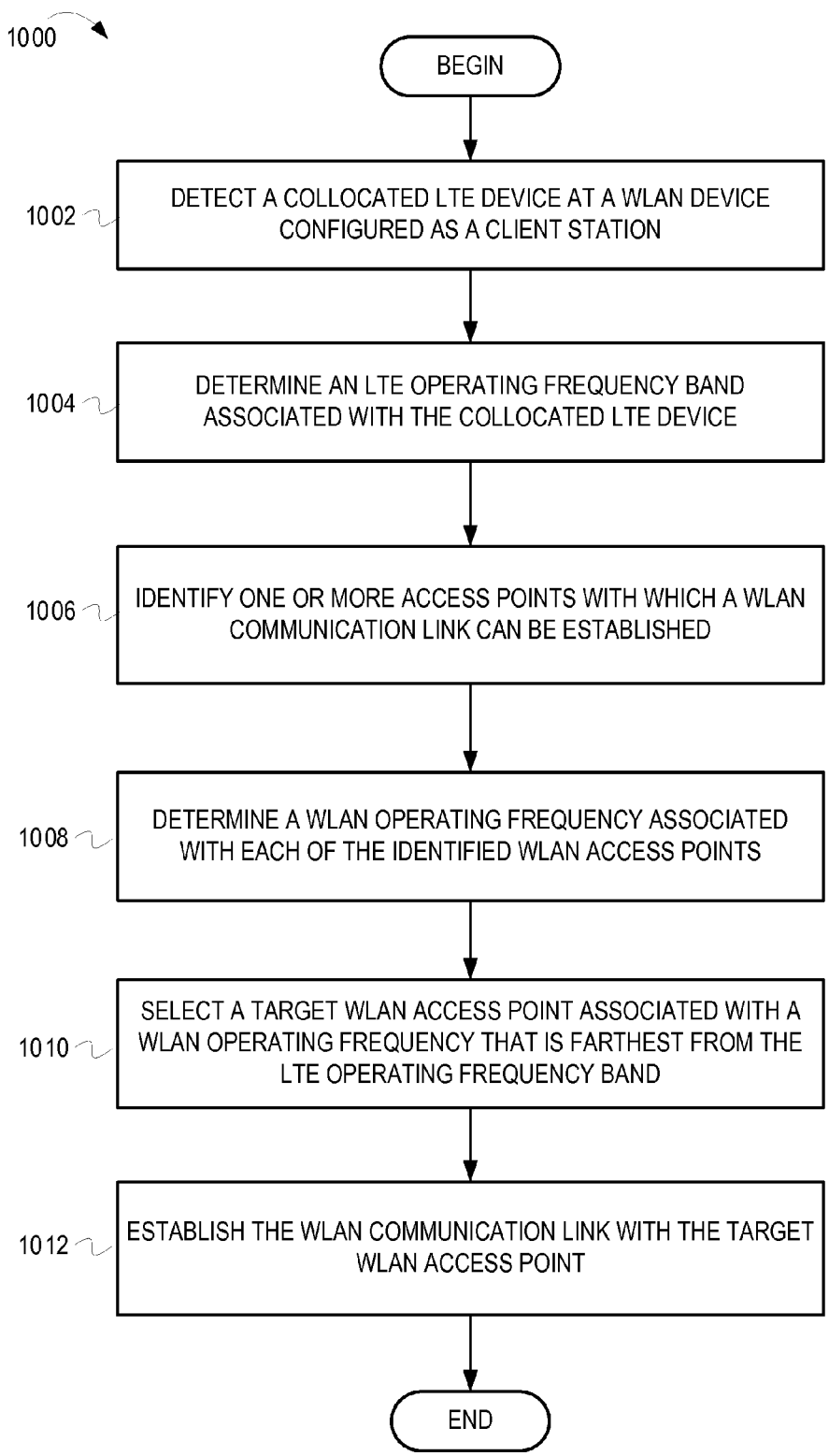
FIG. 10 is a flow diagram illustrating example operations for maximizing frequency separation between a WLAN device and a collocated LTE device when the WLAN device is configured as a WLAN client station.

FIG. 10 is a flow diagram 1000 illustrating example operations for maximizing frequency separation between a WLAN device and a collocated LTE device when the WLAN device is configured as a WLAN client station. The flow 1000 begins at block 1002.

At block 1002, a collocated LTE device is detected at a WLAN device configured as a client station. For example, similarly as was described above, the WLAN coexistence unit 112 can detect the collocated LTE device 102 based on an indication (e.g., a control signal, a coexistence message, etc.) received from the LTE coexistence unit 104, based on reading a predetermined memory location, etc. The flow continues at block 1004.

At block 1004, an LTE operating frequency band associated with the collocated LTE device is determined. For example, similarly as was described above, the WLAN coexistence unit 112 can determine the LTE operating frequency band associated with the collocated LTE device based on the indication identifying the collocated LTE device 102 (received at block 1002), based on reading a predetermined memory location, etc. The flow continues at block 1006.

At block 1006, one or more WLAN access points with which a WLAN communication link can be established are identified. For example, the WLAN processing unit 114 can identify one or more WLAN access points with which the WLAN device 110 can establish the WLAN communication link. The WLAN processing unit 114 can scan available WLAN access points (e.g., listen for beacon messages, exchange probe request/response messages, etc.) and can identify the WLAN access point(s) with which it can establish the WLAN communication link (e.g., based on proximity of the WLAN access point to the WLAN device 110, shared communication parameters, etc.). The flow continues at block 1008.

At block 1008, a WLAN operating frequency associated with each of the identified WLAN access points is determined. For example, the WLAN processing unit 114 can determine the WLAN operating frequency associated with each of the WLAN access points identified at block 1006. The WLAN processing unit 114 can read beacon messages, transmit probe request messages, receive probe response messages, etc. from each of the WLAN access points (identified at block 1006) to determine their respective WLAN operating frequency. For example, the WLAN processing unit 114 may determine that a first WLAN access point uses WLAN channel 1 (with operating frequency 2.412 GHz), that a second WLAN access point uses WLAN channel 3 (with operating frequency 2.422 GHz), and that a third WLAN access point uses WLAN channel 11 (with operating frequency 2.462 GHz). The flow continues at block 1010.

At block 1010, a target WLAN access point associated with a WLAN operating frequency that is farthest from the LTE operating frequency band is identified. For example, the WLAN coexistence unit 114 can select the target WLAN access point as one of the WLAN access points identified at block 1006 that is associated with a WLAN operating frequency that is sufficiently separated from the LTE operating frequency. With reference to the above example, if the collocated LTE device 102 uses LTE band 7 with an LTE operating frequency band of 2.5 GHz to 2.69 GHz, the WLAN coexistence unit 112 can select the first WLAN access point that uses WLAN channel 1. In some implementations, the WLAN coexistence unit 112 can also take interference/noise sources into consideration when selecting the target WLAN access point. For example, if the WLAN coexistence unit 112 determines that WLAN channel 1 is subject to a lot of interference/noise, the WLAN coexistence unit 112 can select another WLAN access point associated with another WLAN operating frequency. In the above example, the WLAN coexistence unit 112 may select the second WLAN access point that uses WLAN channel 3 if WLAN channel 3 is deemed to be sufficiently separated from LTE frequency band 7. The flow continues at block 1012.

At block 1012, the WLAN communication link is established with the target WLAN access point. For example, the WLAN processing unit 114 can exchange association request and response messages, authentication request and response messages, etc. with the target WLAN access point to establish the WLAN communication link with the target WLAN access point. From block 1012, the flow ends.

Although not described with reference to FIG. 10, it is noted that if the WLAN coexistence unit 112 cannot identify any WLAN access point with a WLAN operating frequency that is sufficiently separated from the LTE operating frequency band and with an acceptable noise level, the WLAN coexistence unit 112 can determine not to establish a WLAN communication link with any of the available WLAN access points and can continue to scan for additional WLAN access points.

It should be understood that FIGS. 1-10 are examples meant to aid in understanding embodiments and should not be used to limit embodiments or limit scope of the claims. Embodiments may perform additional operations, fewer operations, operations in a different order, operations in parallel, and some operations differently. Typically, when the WLAN device 110 (e.g., a WLAN access point or a WLAN client station) supports 802.11b/g communication standards (i.e., when the WLAN device 110 does not support block-ACK), the WLAN device 110 expects to receive an acknowledgement (ACK) message when the WLAN device 110 transmits a WLAN packet to a destination WLAN device. If the WLAN device 110 does not receive the ACK message, the WLAN device 110 may retransmit the WLAN packet at progressively lower modulation levels (e.g., at lower data rates) until the ACK message is received or until the lowest modulation level is reached. However, such a rate fallback procedure can increase the packet transmit time. In some implementations, if the WLAN coexistence unit 112 detects the LTE device 102 collocated with the WLAN device 110, the WLAN processing unit 114 may not implement the rate fallback procedures if the WLAN device 110 does not receive the ACK message in response to a transmitted WLAN packet. In some implementations, the WLAN processing unit 114 may not implement the rate fallback procedures if it is determined that the LTE device 102 is scheduled to transmit/receive an LTE packet, or if it is determined that the LTE allocated communication time interval will start. In another implementation, the WLAN processing unit 114 may disable the rate fallback procedures on detecting the collocated LTE device 102. The WLAN processing unit 114 may retransmit the WLAN packet at the original modulation level. In another implementation, the WLAN processing unit 114 may implement the rate fallback procedures only if the WLAN packet can be completely retransmitted at a lower modulation level within the WLAN allocated communication time interval. Otherwise, the WLAN processing unit 114 may wait until the next WLAN allocated communication time interval to retransmit the WLAN packet at the lower modulation level. This can help prevent an "avalanche" effect because of WLAN packet retransmission at progressively lower modulation levels. Preventing the rate fallback procedures can also help minimize collision between retransmitted WLAN packets and LTE packets.

It is also noted that in some implementations the WLAN coexistence unit 112 and the LTE coexistence unit 104 may be capable of resolving contention between the WLAN schedule information 116 and the LTE schedule information 108. For example, using coexistence messages transmitted via the interface 120, the WLAN coexistence unit 112 and the LTE coexistence unit 104 may resolve contention based on priority of pending WLAN and LTE communications or based on a start time of the communications.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). A machine-readable medium may be a non-transitory machine-readable storage medium, or a transitory machine-readable signal medium. A machine-readable storage medium may include, for example, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of tangible medium suitable for storing electronic instructions. A machine-readable signal medium may include a propagated data signal with computer readable program code embodied therein, for example, an electrical, optical, acoustical, or other form of propagated signal (e.g., carrier waves, infrared signals, digital signals, etc.). Program code embodied on a machine-readable medium may be transmitted using any suitable medium, including, but not limited to, wireline, wireless, optical fiber cable, RF, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 11:
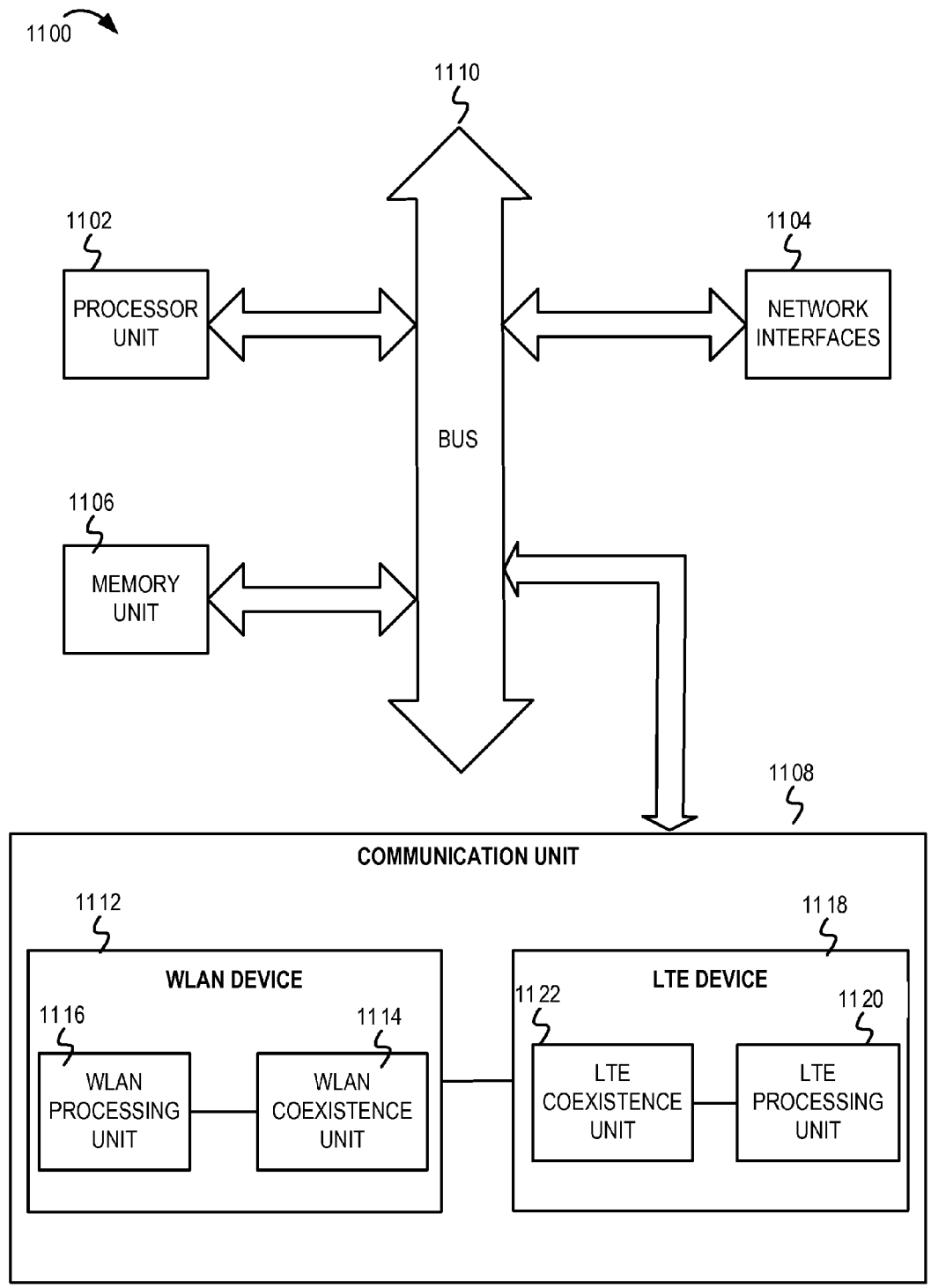
FIG. 11 is a block diagram of an electronic system including a coexistence mechanism between collocated wireless communication devices, according to some embodiments.

FIG. 11 is a block diagram of an electronic system 1100 including a coexistence mechanism between collocated wireless communication devices, according to some embodiments. In some implementations, the electronic system 1100 may be one of a personal computer (PC), a laptop, a tablet computer, a netbook, a mobile phone, a gaming console, or other electronic devices comprising a collocated WLAN device 1112 and an LTE device 1118. In some implementations, the LTE device 1118 and the WLAN device 1112 can be embodied on distinct integrated circuits (e.g., distinct LTE and WLAN chips) on a common circuit board (or on separate circuit boards in close proximity). In other implementations, the LTE device 1118 and the WLAN device 1112 can be embodied on a single integrated circuit (e.g., a system on a chip (SoC)). The LTE device 1118 and the WLAN device 1112 can be included within various types of electronic devices with wireless communication capabilities (e.g., mobile phones, notebook computer, tablet computers, gaming consoles, personal computers, etc). The electronic system 1100 includes a processor unit 1102 (possibly including multiple processors, multiple cores, multiple nodes, and/or implementing multi-threading, etc.). The electronic system 1100 includes a memory unit 1106. The memory unit 1106 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic system 1100 also includes a bus 1110 (e.g., PCI, ISA, PCI-Express, HyperTransport®, InfiniBand®, NuBus, etc.), and network interfaces 1104 that include one or more of a wireless network interface (e.g., a WLAN interface, a Bluetooth® interface, a WiMAX interface, a ZigBee® interface, a Wireless USB interface, etc.) and a wired network interface (e.g., an Ethernet interface, etc.).

The electronic system 1100 also includes a communication unit 1108. The communication unit 1108 comprises the WLAN device 1112 and the LTE device 1118. In some implementations, the LTE device 1118 comprises an LTE coexistence unit 1122 coupled to an LTE processing unit 1120. The WLAN device 1112 comprises a WLAN coexistence unit 1114 coupled to a WLAN processing unit 1116. In some implementations, as described with reference to FIGS. 1-3, the WLAN coexistence unit 1114 and the LTE coexistence unit 1122 can schedule their respective communications within a WLAN allocated communication time interval and an LTE allocated communication time interval respectively. In another implementation, as described with reference to FIGS. 4-5, the WLAN coexistence unit 1114 may schedule its communications so that WLAN transmissions coincide with an LTE transmit interval and WLAN receptions coincide with an LTE receive interval. In another implementation, as described with reference to FIGS. 6-8, the WLAN coexistence unit 1114 can schedule WLAN transmissions within the LTE transmit interval of the WLAN allocated communication time interval. Furthermore, as described in FIGS. 9-10, the WLAN coexistence unit 1114 may comprise functionality to select a WLAN frequency channel (when the WLAN device 1112 is configured as an access point) or to select a WLAN access point based on the operating frequency of the WLAN access points (e.g., when the WLAN device 1112 is configured as a client station).

Any one of the above-described functionalities may be partially (or entirely) implemented in hardware and/or on the processor unit 1102. For example, the functionality may be implemented with an application specific integrated circuit, in logic implemented in the processor unit 1102, in a co-processor on a peripheral device or card, etc. Further, realizations may include fewer or additional components not illustrated in FIG. 11 (e.g., additional network interfaces, peripheral devices, etc.). The processor unit 1102 and the network interfaces 1104 are coupled to the bus 1110. Although illustrated as being coupled to the bus 1110, the memory 1106 may be coupled to the processor unit 1102.

While the embodiments are described with reference to various implementations and exploitations, it will be understood that these embodiments are illustrative and that the scope of the inventive subject matter is not limited to them. In general, a coexistence mechanism for collocated WLAN and WWAN communication devices as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
    determining, at a wireless local area network (WLAN) device of a communication system, a WLAN communication time interval associated with the WLAN device for performing WLAN communication operations and a wireless wide area network (WWAN) communication time interval associated with a WWAN device of the communication system for performing WWAN communication operations, wherein the WLAN device is coupled with the WWAN device;
    determining, at the WLAN device, whether the WLAN communication time interval is in progress to determine whether to perform one or more WLAN communication operations;
    performing, at the WLAN device, the one or more WLAN communication operations in response to determining that the WLAN communication time interval is in progress;
    in response to determining that the WLAN communication time interval is not in progress, determining whether a transmit sub-interval of the WWAN communication time interval is in progress, determining, at the WLAN device, not to perform the one or more WLAN communication operations in response to determining that the transmit sub-interval of the WWAN communication time interval is in progress; and performing, at the WLAN device, the one or more WLAN communication operations in response to determining that a receive sub-interval of the WWAN communication time interval is in progress.

2. The method of claim 1, wherein said determining the WLAN communication time interval associated with the WLAN device and the WWAN communication time interval associated with the WWAN device comprises:

determining, at the WLAN device, the WLAN communication time interval associated with the WLAN device and the WWAN communication time interval associated with the WWAN device providing, from the WLAN device, a coexistence signal to the WWAN device indicating the WLAN communication time interval associated with the WLAN device and the WWAN communication time interval associated with the WWAN device.

3. The method of claim 2, wherein said providing the coexistence signal indicating the WLAN communication time interval associated with the WLAN device and the WWAN communication time interval associated with the WWAN device to the WWAN device comprises:

sending the coexistence signal via a coexistence interface coupled between the WLAN device and the WWAN device.

4. The method of claim 1, wherein said determining the WLAN communication time interval associated with the WLAN device and the WWAN communication time interval associated with the WWAN device comprises:

receiving, at the WLAN device from the WWAN device, an indication of the WWAN communication time interval associated with the WWAN device; and determining, at the WLAN device, the WLAN communication time interval associated with the WLAN device in response to said receiving the indication of the WWAN communication time interval associated with the WWAN device.

5. The method of claim 1, wherein said determining the WLAN communication time interval associated with the WLAN device and the WWAN communication time interval associated with the WWAN device comprises:

receiving, at the WLAN device from the WWAN device, an indication of the WLAN communication time interval associated with the WLAN device and the WWAN communication time interval associated with the WWAN device.

6. The method of claim 1, wherein said determining the WLAN communication time interval associated with the WLAN device and the WWAN communication time interval associated with the WWAN device is based on at least one of a WLAN beacon interval, a WWAN frame structure, a WWAN communication schedule, and a WLAN communication schedule.

7. The method of claim 1, wherein the WLAN device comprises an Institute of Electrical and Electronics Engineers (IEEE) 802.11b device, an IEEE 802.11g device, or an IEEE 802.11n device, and the WWAN device comprises a Long-term evolution (LTE) device or a Worldwide Interoperability for Microwave Access (WiMAX) device.

8. The method of claim 1, wherein the WLAN communication time interval and the WWAN communication time interval are consecutive and periodically repeating time intervals.

9. The method of claim 1, further comprising:
transmitting, to one or more network devices connected to the WLAN device, at least one of a duration of the WLAN communication time interval and a periodicity of the WLAN communication time interval.

10. The method of claim 1, further comprising:
detecting, at the WLAN device, the WWAN device based, at least in part, on a digital control signal provided from the WWAN device to the WLAN device.

11. The method of claim 1, wherein, if the WLAN device is configured to operate as a WLAN access point, said performing the one or more WLAN communication operations in response to determining that the WLAN communication time interval is in progress further comprises at least one of:

receiving one or more WLAN packets from one or more network devices connected to the WLAN device, and transmitting one or more WLAN packets to one or more network devices connected to the WLAN device.

12. The method of claim 1, wherein, if the WLAN device is configured to operate as a WLAN access point, in response to determining that the WLAN communication time interval is in progress, the method further comprises:

determining, at the WLAN device, whether to handoff control to the WWAN device to initiate the WWAN communication time interval;

broadcasting a control message to one or more network devices connected to the WLAN device to prevent subsequent communication of the one or more network devices with the WLAN device, in response to determining to handoff control to the WWAN device to initiate the WWAN communication time interval; and continuing to perform the one or more WLAN communication operations in response to determining not to handoff control to the WWAN device.

13. The method of claim 12, wherein in response to said broadcasting the control message to the one or more network devices to prevent subsequent communication of the one or more network devices with the WLAN device, the method further comprises:

switching, at the WLAN device, to a low power state for the WWAN communication time interval.

14. The method of claim 1, wherein each of the WLAN communication time interval and the WWAN communication time interval comprise one or more transmit sub-intervals and one or more receive sub-intervals.

15. The method of claim 14, further comprising:
receiving, at the WLAN device, a transmit sub-interval duration and a receive sub-interval duration from the WWAN device; and determining, at the WLAN device, the one or more transmit sub-intervals associated with the WLAN communication time interval, the one or more receive sub-intervals associated with the WLAN communication time interval, the one or more transmit sub-intervals associated with the WWAN communication time interval, the one or more receive sub-intervals associated with the WWAN communication time interval based, at least in part, on the transmit sub-interval duration and the receive sub-interval duration.

16. The method of claim 14, wherein, if the WLAN device is configured to operate as a WLAN client station, in response to determining that the WLAN communication time interval is in progress, the method further comprises:

determining whether one of the one or more transmit sub-intervals is in progress;

transmitting one or more available WLAN packets in response to determining the one of the one or more transmit sub-intervals is in progress;

determining whether the one of the one or more transmit sub-intervals is scheduled to elapse within a predetermined period of time; and requesting, from an access point to which the WLAN device is connected, one or more available WLAN packets intended for the WLAN device in response to determining that the one of the one or more transmit sub-intervals is scheduled to elapse within the predetermined period of time.

17. The method of claim 16, further comprising:
receiving, at the WLAN device, the one or more available WLAN packets intended for the WLAN device from the access point during one of the one or more receive sub-intervals of the WLAN communication time interval.

18. The method of claim 16, wherein the predetermined period of time is based, at least in part, on a transmission duration associated with transmitting a request message for said requesting, from the access point to which the WLAN device is connected, the one or more available WLAN packets intended for the WLAN device.

19. The method of claim 14 wherein, if the WLAN device is configured to operate as a WLAN client station, the method comprises:
switching to a low power state and said determining to not perform the one or more WLAN communication operations in response to determining that the transmit sub-interval of the WWAN communication time interval is in progress; and
receiving, from an access point to which the WLAN device is connected, one or more available WLAN packets intended for the WLAN device during one of the one or more receive sub-intervals of the WWAN communication time interval, in response to determining that the transmit sub-interval of the WWAN communication time interval is not in progress.

20. The method of claim 1, wherein, if the WLAN device is configured to operate as a WLAN access point, the method further comprises:
determining an operating frequency band associated with the WWAN device;
selecting an operating frequency associated with the WLAN device based, at least in part, on the operating frequency band associated with the WWAN device.

21. The method of claim 20, wherein said selecting the operating frequency associated with the WLAN device comprises at least one of:
selecting the operating frequency associated with the WLAN device that is separated from the operating frequency band associated with the WWAN device by at least a threshold frequency separation, and
selecting the operating frequency associated with the WLAN device that is farthest from the operating frequency band associated with the WWAN device.

22. The method of claim 1, wherein, if the WLAN device is configured to operate as a WLAN client station, the method further comprises:
determining an operating frequency band associated with the WWAN device;
identifying one or more access points available to the WLAN device to establish a communication link;
determining, for each of the one or more access points available to the WLAN device to establish the communication link, an operating frequency associated with the access point; and
selecting a target access point from the one or more access points available to the WLAN device to establish the communication link based, at least in part, on the operating frequency band associated with the WWAN device and the operating frequency associated with each of the one or more access points.

23. The method of claim 1, further comprising:
determining, at the WLAN device, that an acknowledgement for a packet transmitted by the WLAN device was not received during the WLAN communication time interval; and
determining, at the WLAN device, to not decrease a transmit rate for retransmitting the packet for which the acknowledgement was not received during the WLAN communication time interval.

24. The method of claim 1, wherein the WLAN device coupled with the WWAN device comprises one of:
the WLAN device collocated with the WWAN device within a common integrated circuit,
the WLAN device collocated with the WWAN device on a common circuit board, and
the WLAN device the WWAN device implemented on separate circuit boards that are proximate to each other.

25. A communication system comprising:
a wireless local area network (WLAN) device comprising a WLAN coexistence unit, the WLAN coexistence unit operable to:
determine a WLAN communication time interval associated with the WLAN device for performing WLAN communication operations and a wireless wide area network (WWAN) communication time interval associated with a WWAN device of the communication system for performing WWAN communication operations;
provide a coexistence signal to the WWAN device indicating the WLAN communication time interval associated with the WLAN device and the WWAN communication time interval associated with the WWAN device;
determine whether the WLAN communication time interval is in progress to determine whether to perform one or more WLAN communication operations;
perform the one or more WLAN communication operations in response to determining that the WLAN communication time interval is in progress;
in response to determining that the WLAN communication time interval is not in progress, determine whether a transmit sub-interval of the WWAN communication time interval is in progress,
determine not to perform the one or more WLAN communication operations in response to determining that the transmit sub-interval of the WWAN communication time interval is in progress; and
perform the one or more WLAN communication operations in response to determining that a receive sub-interval of the WWAN communication time interval is in progress; and
the WWAN device coupled to the WLAN device via a coexistence interface, wherein the WWAN device comprises a WWAN coexistence unit, the WWAN coexistence unit operable to:
determine whether the WWAN communication time interval is in progress to determine whether to perform one or more WWAN communication operations, based on the coexistence signal received from the WLAN device indicating the WLAN communication time interval associated with the WLAN device and the WWAN communication time interval associated with the WWAN device;

perform the one or more WWAN communication operations in response to determining that the WWAN communication time interval is in progress; and determine not to perform the one or more WWAN communication operations in response to determining that the WWAN communication time interval is not in progress.

26. The communication system of claim 25, wherein the WLAN device comprises an Institute of Electrical and Electronics Engineers (IEEE) 802.11b device, an IEEE 802.11g device, or an 802.11n device, and the WWAN device comprises a Long-term evolution (LTE) device or a Worldwide Interoperability for Microwave Access (WiMAX) device.

27. The communication system of claim 25, wherein, if the WLAN device is configured to operate as a WLAN access point, in response to the WLAN coexistence unit determining that the WLAN communication time interval is in progress, the WLAN coexistence unit is further operable to:

determine whether to handoff control to the WWAN device to initiate the WWAN communication time interval;

broadcast a control message to one or more network devices connected to the WLAN device to prevent subsequent communication of the one or more network devices with the WLAN device, in response to the WLAN coexistence unit determining to handoff control to the WWAN device to initiate the WWAN communication time interval; and continue to perform the one or more WLAN communication operations in response to the WLAN coexistence unit determining not to handoff control to the WWAN device.

28. The communication system of claim 25, wherein each of the WLAN communication time interval and the WWAN communication time interval comprise one or more transmit sub-intervals and one or more receive sub-intervals, and wherein, if the WLAN device is configured to operate as a WLAN client station, in response to the WLAN coexistence unit determining that the WLAN communication time interval is in progress, the WLAN coexistence unit is further operable to:

determine whether one of the one or more transmit sub-intervals is in progress;

transmit one or more available WLAN packets in response to the WLAN coexistence unit determining that the one of the one or more transmit sub-intervals is in progress;

determining whether the one of the one or more transmit sub-intervals is scheduled to elapse within a predetermined period of time; and request, from an access point to which the WLAN device is connected, one or more available WLAN packets intended for the WLAN device, in response to the WLAN coexistence unit determining that the one of the one or more transmit sub-intervals is scheduled to elapse within the predetermined period of time.

29. The communication system of claim 25, wherein each of the WLAN communication time interval and the WWAN communication time interval comprise one or more transmit sub-intervals and one or more receive sub-intervals, and wherein if the WLAN device is configured to operate as a WLAN client station, the WLAN coexistence unit is further operable to:

switch to a low power state and determine to not perform the one or more WLAN communication operations in response to the WLAN coexistence unit determining that the transmit sub-interval of the WWAN communication time interval is in progress; and receive, from an access point to which the WLAN device is connected, one or more available WLAN packets intended for the WLAN device during one of the one or more receive sub-intervals of the WWAN communication time interval, in response to the WLAN coexistence unit determining that the transmit sub-interval of the WWAN communication time interval is not in progress.

30. The communication system of claim 25, wherein, in response to the WWAN coexistence unit determining that the WWAN communication time interval is in progress, the WWAN coexistence unit is further operable to:

determine whether to handoff control to the WLAN device to initiate the WLAN communication time interval;

transmit, to a WWAN base station to which the WWAN device is connected, a WWAN control message to prevent subsequent communication between the WWAN device with the WWAN base station, in response to the WWAN coexistence unit determining to handoff control to the WLAN device to initiate the WLAN communication time interval; and continue to perform the one or more WWAN communication operations in response to the WWAN coexistence unit determining not to handoff control to the WLAN device.

31. A method comprising:

determining, at a wireless local area network (WLAN) device of a communication system, a transmit time interval and a receive time interval associated with a wireless wide area network (WWAN) device of the communication system, wherein the WLAN device is coupled with the WWAN device, wherein said determining the transmit time interval and a receive time interval associated with the WWAN device is based, at least in part, on a coexistence signal received from the WWAN device indicating the transmit time interval and the receive time interval;

determining, at the WLAN device, whether the transmit time interval associated with the WWAN device is in progress;

performing, at the WLAN device, one or more WLAN transmission operations, in response to determining that the transmit time interval associated with the WWAN device is in progress; and performing, at the WLAN device, one or more WLAN reception operations in response to determining that the receive time interval associated with the WWAN device is in progress and that the transmit time interval associated with the WWAN device is not in progress.

32. The method of claim 31, wherein the WLAN device comprises an Institute of Electrical and Electronics Engineers (IEEE) 802.11b device, an IEEE 802.11g device, or an 802.11n device, and the WWAN device comprises a Long-term evolution (LTE) device or a Worldwide Interoperability for Microwave Access (WiMAX) device.

33. The method of claim 31, wherein the transmit time interval and the receive time interval associated with the WWAN device are consecutive and periodically repeating time intervals.

34. The method of claim 31, further comprising:

determining, at the WLAN device, not to perform the one or more WLAN transmission operations, in response to determining that the receive time interval associated with the WWAN device is in progress; and determining, at the WLAN device, not to perform the one or more WLAN reception operations in response to determining that the transmit time interval associated with the WWAN device is in progress.

35. The method of claim 31, wherein, in response to determining that the transmit time interval associated with the WWAN device is in progress, the method further comprises:

transmitting one or more available WLAN packets to an access point to which the WLAN device is connected;

determining whether the transmit time interval associated with the WWAN device is scheduled to elapse within a predetermined period of time; and requesting, from the access point to which the WLAN device is connected, one or more available WLAN packets intended for the WLAN device in response to determining that the transmit time interval associated with the WWAN device is scheduled to elapse within the predetermined period of time.

36. The method of claim 35, wherein the predetermined period of time is based, at least in part, on a transmission duration associated with transmitting a request message for said requesting, from the access point to which the WLAN device is connected, the one or more available WLAN packets intended for the WLAN device.

37. One or more non-transitory machine-readable storage media, having instructions stored therein, which when executed by one or more processors causes the one or more processors to perform operations that comprise:

determining a wireless local area network (WLAN) communication time interval associated with a WLAN device of a communication system for performing WLAN communication operations and a wireless wide area network (WWAN) communication time interval associated with a WWAN device of the communication system for performing WWAN communication operations, wherein the WLAN device is coupled with the WWAN device;

providing a coexistence signal to the WWAN device indicating the WLAN communication time interval associated with the WLAN device and the WWAN communication time interval associated with the WWAN device;

determining whether the WLAN communication time interval is in progress to determine whether to perform one or more WLAN communication operations;

performing the one or more WLAN communication operations in response to determining that the WLAN communication time interval is in progress;

in response to determining that the WLAN communication time interval is not in progress, determining whether a transmit sub-interval of the WWAN communication time interval is in progress;

determining not to perform the one or more WLAN communication operations in response to determining that the transmit sub-interval of the WWAN communication time interval is in progress; and performing, at the WLAN device, the one or more WLAN communication operations in response to determining that a receive sub-interval of the WWAN communication time interval is in progress.

38. The machine-readable storage media of claim 37, wherein, if the WLAN device is configured to operate as a WLAN access point, in response to said operation of determining that the WLAN communication time interval is in progress, the operations further comprise:

determining whether to handoff control to the WWAN device to initiate the WWAN communication time interval;

broadcasting a control message to one or more network devices connected to the WLAN device to prevent subsequent communication of the one or more network devices with the WLAN device, in response to determining to handoff control to the WWAN device to initiate the WWAN communication time interval; and continuing to perform the one or more WLAN communication operations in response to determining not to handoff control to the WWAN device.

39. The machine-readable storage media of claim 37, wherein each of the WLAN communication time interval and the WWAN communication time interval comprise one or more transmit sub-intervals and one or more receive sub-intervals, and wherein, if the WLAN device is configured to operate as a WLAN client station, said operation of determining that the WLAN communication time interval is in progress further comprises:

determining whether one of the one or more transmit sub-intervals is in progress;

transmitting one or more available WLAN packets in response to determining that the one of the one or more transmit sub-intervals is in progress;

determining whether the one of the one or more transmit sub-intervals is scheduled to elapse within a predetermined period of time; and requesting, from an access point to which the WLAN device is connected, one or more available WLAN packets intended for the WLAN device, in response to determining that the one of the one or more transmit sub-intervals is scheduled to elapse within the predetermined period of time.

* * * * *